(12) United States Patent
Nakashima et al.

(10) Patent No.: US 8,305,934 B2
(45) Date of Patent: Nov. 6, 2012

(54) COMPUTER PROGRAM, APPARATUS, AND METHOD FOR MANAGING NETWORK

(75) Inventors: Kohta Nakashima, Kawasaki (JP); Kouichi Kumon, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 350 days.

(21) Appl. No.: 12/837,828

(22) Filed: Jul. 16, 2010

(65) Prior Publication Data
US 2011/0019535 A1    Jan. 27, 2011

(30) Foreign Application Priority Data
Jul. 27, 2009 (JP) ................................ 2009-174108

(51) Int. Cl.
H04L 1/00 (2006.01)
(52) U.S. Cl. ........................................................ 370/254
(58) Field of Classification Search .................. 370/229, 370/230, 235, 236.2, 237, 254, 351, 389, 370/390, 392, 428; 709/223–225, 238, 242
See application file for complete search history.

(56) References Cited

U.S. PATENT DOCUMENTS

| | | | | |
|---|---|---|---|---|
| 6,330,229 B1 * | 12/2001 | Jain et al. | ...................... | 370/256 |
| 7,636,299 B2 * | 12/2009 | Asa et al. | ...................... | 370/216 |
| 7,848,259 B2 * | 12/2010 | Gray et al. | ...................... | 370/255 |

FOREIGN PATENT DOCUMENTS

| | | | |
|---|---|---|---|
| JP | 2001-308893 A | 11/2001 | |
| JP | 2006-270169 A | 10/2006 | |

* cited by examiner

*Primary Examiner* — Frank Duong
(74) *Attorney, Agent, or Firm* — Fujitsu Patent Center

(57) ABSTRACT

In response to a route-changing event, original routes on the network are changed to new routes. A destination-reachable range is identified as a range from which packets can reach an information processing device specified by a destination address. Modification of forwarding data is performed for a neighbor communication device which is located outside the destination-reachable range and adjacent to a communication device in the destination-reachable range, so as to enable forwarding of packets to that communication device in the destination-reachable range. The modified forwarding data is then transmitted to the neighbor communication device. The modification made to the forwarding data results in an additional destination-reachable range, which is thus added to the destination-reachable range. Another cycle of processing is then performed on the basis of the expanded destination-reachable range.

9 Claims, 34 Drawing Sheets

FIG. 4

60 FDB

OUTPUT PORT SETUP TABLE

61

| DLID | OUTPUT PORT |
|------|-------------|
| 0x0  | 0xff        |
| 0x1  | 5           |
| 0x2  | 2           |
| 0x3  | 2           |
| 0x4  | 5           |
| ⋮    | ⋮           |
| 0x3f | 2           |

62

| DLID | OUTPUT PORT |
|------|-------------|
| 0x40 | 3           |
| 0x41 | 2           |
| 0x42 | 2           |
| 0x43 | 1           |
| 0x44 | 4           |
| ⋮    | ⋮           |
| 0x5f | 5           |

120 FDB MEMORY

FORWARDING DATABASES

121 SWITCH A

| DLID | OUTPUT PORT |
|------|-------------|
| 0x0  | 0xff        |
| 0x1  | 5           |
| 0x2  | 3           |
| 0x3  | 1           |
| ⋮    | ⋮           |
| 0x3f | 0xff        |

122 SWITCH B

| DLID | OUTPUT PORT |
|------|-------------|
| 0x0  | 0xff        |
| 0x1  | 3           |
| 0x2  | 2           |
| 0x3  | 1           |
| ⋮    | ⋮           |
| 0x3f | 0xff        |

123 SWITCH C

| DLID | OUTPUT PORT |
|------|-------------|
| 0x0  | 0xff        |
| 0x1  | 3           |
| 0x2  | 2           |
| 0x3  | 2           |
| ⋮    | ⋮           |
| 0x3f | 0xff        |

124 SWITCH D

| DLID | OUTPUT PORT |
|------|-------------|
| 0x0  | 0xff        |
| 0x1  | 1           |
| 0x2  | 1           |
| 0x3  | 1           |
| ⋮    | ⋮           |
| 0x3f | 0xff        |

125 SWITCH E

| DLID | OUTPUT PORT |
|------|-------------|
| 0x0  | 0xff        |
| 0x1  | 1           |
| 0x2  | 2           |
| 0x3  | 5           |
| ⋮    | ⋮           |
| 0x3f | 0xff        |

126 SWITCH F

| DLID | OUTPUT PORT |
|------|-------------|
| 0x0  | 0xff        |
| 0x1  | 3           |
| 0x2  | 2           |
| 0x3  | 2           |
| ⋮    | ⋮           |
| 0x3f | 0xff        |

FIG. 16

151 ROUTE DETERMINATION TABLE

| \multicolumn{4}{c|}{DLID: 0x1} | | | |
|---|---|---|---|
| SWITCH ID | MATCH FLAG | DESTINATION-REACHABLE FLAG | SEARCH-DONE FLAG |
| A | 1 | 1 | 1 |
| B | 1 | 1 | 1 |
| C | 1 | 1 | 1 |
| D | 1 | 1 | 1 |
| E | 1 | 1 | 1 |
| F | 0 | 0 | 0 |
| G | 0 | 0 | 0 |
| H | 0 | 0 | 0 |
| I | 1 | 0 | 0 |
| J | 1 | 0 | 0 |
| K | 0 | 0 | 0 |
| L | 0 | 0 | 0 |

FIG. 21

151 ROUTE DETERMINATION TABLE

| DLID: 0x1 | | | |
|---|---|---|---|
| SWITCH ID | MATCH FLAG | DESTINATION-REACHABLE FLAG | SEARCH-DONE FLAG |
| A | 1 | 1 | 1 |
| B | 1 | 1 | 1 |
| C | 1 | 1 | 1 |
| D | 1 | 1 | 1 |
| E | 1 | 1 | 1 |
| F | 0 | 0 | 0 |
| G | 1 | 1 | 1 |
| H | 0 | 0 | 0 |
| I | 1 | 1 | 1 |
| J | 1 | 0 | 0 |
| K | 1 | 1 | 1 |
| L | 0 | 0 | 0 |

FIG. 27

251 PARTIAL ORDER NUMBER TABLE

| DEST ADDRESS \ SWITCH | A | B | C | D | E | F | G | H | I | J |
|---|---|---|---|---|---|---|---|---|---|---|
| 0x1 | - | 2 | 3 | 2 | 1 | 4 | - | 1 | 1 | 2 |
| 0x2 | - | 3 | 4 | 1 | 1 | 2 | - | 1 | 2 | - |
| 0x3 | 2 | - | - | 2 | 3 | 2 | 1 | 4 | 1 | 2 |
| 0x4 | - | 1 | 2 | 2 | 2 | 2 | - | - | 1 | 2 |
| 0x5 | - | - | - | 1 | 1 | 1 | - | 4 | 2 | - |
| 0x6 | 2 | 3 | 1 | 2 | 3 | 2 | 1 | 3 | 1 | 2 |

FIG. 33

252   PARTIAL ORDER NUMBER TABLE

| DLID | A | B | C | D | E | F | G | H | I | J | K | L |
|------|---|---|---|---|---|---|---|---|---|---|---|---|
| 0x1  | - | - | - | - | - | 2 | 1 | 2 | - | - | 1 | 2 |
| 0x2  | 2 | 1 | - | - | - | 3 | 2 | 3 | 3 | 4 | - | - |
| 0x3  | - | - | - | - | - | 2 | 1 | 2 | 2 | 3 | - | - |

FIG. 34

ORIGINAL

| DLID | OUTPUT PORT |
|---|---|
| 0x0 | 0xff |
| 0x1 | 3 |
| 0x2 | 2 |
| 0x3 | 2 |
| ⋮ | ⋮ |
| 0x3f | 0xff |

61a

AFTER SECOND CYCLE OF FDB UPDATE

| DLID | OUTPUT PORT |
|---|---|
| 0x0 | 0xff |
| 0x1 | 1 |
| 0x2 | 2 |
| 0x3 | 1 |
| ⋮ | ⋮ |
| 0x3f | 0xff |

61b

AFTER THIRD CYCLE OF FDB UPDATE

| DLID | OUTPUT PORT |
|---|---|
| 0x0 | 0xff |
| 0x1 | 1 |
| 0x2 | 1 |
| 0x3 | 1 |
| ⋮ | ⋮ |
| 0x3f | 0xff |

61c

SWITCH F

COMPUTER PROGRAM, APPARATUS, AND METHOD FOR MANAGING NETWORK

CROSS-REFERENCE TO RELATED APPLICATION(S)

This application is based upon and claims the benefit of priority of the prior Japanese Patent Application No. 2009-174108, filed on Jul. 27, 2009, the entire contents of which are incorporated herein by reference.

FIELD

The embodiments discussed herein relate to a computer program, apparatus, and method for managing a network.

BACKGROUND

Computer networks interconnect a plurality of computers (information processing devices) via many intervening communication devices such as switches. Each communication device forwards packets to an appropriate direction depending on their respective destinations. The forwarding paths of packets in a network can be controlled in a desired way by appropriately programming forwarding directions at each communication device.

Some computer networks have a more complex structure than loop networks. Specifically, one such network has the following features (1) to (5):

(1) Computers, referred to as nodes, communicate information in the form of packets. Each node is identified by an address.
(2) Packets contain address information specifying to which node they should be forwarded.
(3) Each switch has a forwarding database (FDB) describing output ports associated with address of each destination node of packets.
(4) Switches determine which output port to use to forward a received packet, by consulting their respective FDBs based on the packet's destination node address. The received packet is then directed to the determined output port.
(5) FDB of each switch is configured under the control of a network management apparatus.

InfiniBand™ is one of such networks providing all the noted features. Ethernet® also provides the features of (1) to (4) and thus may fall in the category of the above network if it employs FDB-based switches under the control of a network management apparatus.

In the above-noted type of network, the forwarding paths of packets can be configured for each destination node. It is therefore possible to ensure the bandwidth and redundancy of the network by configuring FDB in each switch in an appropriate manner.

The setup of forwarding paths in a network may be changed in the following cases:

Failure: Forwarding routes are modified to detour around the failed node or link, so as to achieve fault-tolerant communication.
Maintenance: Some maintenance works necessitate partial disconnection of the network. Forwarding routes are modified to detour around the disconnected portion, so as not to disrupt communication during the maintenance.
Performance Tuning: Forwarding routes are optimized for a specific purpose, so as to enhance the network performance in the intended use.

Upon occurrence of such a route-changing event, the network management apparatus executes a route changing process in the following way.

Step 1: The network management apparatus calculates new routes that achieve the purpose of fault-tolerance or performance enhancement, thus creating an updated FDB for each relevant switch.
Step 2: The network management apparatus distributes the created FDBs to switches, which permits each receiving switch to update its local FDB. The entire network is thus reconfigured with the new routes.

The conventional method of FDB distribution, however, does not particularly care about in what order the switches should receive their FDBs. Hence it could lead to unintended production of a loop during the course of changing packet routes. The term "loop" or "switching loop" refers to a closed path of packets which begins and ends at the same point on the network.

Suppose, for example, that the network has originally been configured to forward packets from switch A to switch B when those packets are destined for node X. FDB in switch A is thus programmed to forward such node-X packets to switch B, and FDB in switch B is programmed to forward the same to another switch other than switch A. Suppose now that the network has to be reconfigured to forward packets for node X in the opposite direction, i.e., from switch B to switch A, because of some event that necessitates doing so. The conventional method may apply the change to switch B earlier than to switch A. This means that the FDB of switch A still maintains its original content just after the update of FDB at switch B. When a packet addressed to node X arrives, switch A forwards it to switch B as before. Switch B, on the other hand, forwards that packet back to switch A as specified by its new FDB. As a result, the packet addressed to node X is retransmitted back and forth between two switches A and B, where a loop is produced.

One method to avoid the problem of loops is to reset every switch's FDB and reprograms them from scratch. This method, however, disrupts communication during the reprogramming of FDBs. Particularly in the case of resetting switches for the purpose of recovery from failure, all switches in the network become unable to deliver packets to their destinations, even if the direct effect of the failure could be confined in a small portion of the network. From the viewpoint of stability of network operations, the above method is inappropriate since it expands the effect of failure.

It is also noted that the above problem applies not only to the networks of switches using FDB for management of forwarding destinations, but also to a wide range of networks which employ a network management apparatus to modify the forwarding data for each packet destination.

SUMMARY

According to an aspect of the invention, there is provided a non-transitory computer-readable medium encoded with a network management program for managing a plurality of communication devices which forward packets based on forwarding data describing associations between destination addresses and output ports. When executed by a computer, the network management program causes the computer to execute a procedure including the following operations: changing original routes, which have been determined from forwarding data of the communication devices, to new routes in response to an event that influences existing forwarding routes of packets; identifying a destination-reachable range from which packets can reach a destination information processing device specified by a destination address, by extracting partial routes that include at least a communication device adjacent to the destination information processing device and belong to both the original routes before update and the new routes after update; identifying a destination-unreachable range from which no packets can reach the destination information processing device, by excluding the identified destination-reachable range from the original routes; modifying output port parameters in the forwarding data of a neighbor communication device which is located in the destination-unreachable range and adjacent to one of the communication devices in the destination-reachable range, so as to permit forwarding of packets from the neighbor communication device to the one of the communication devices in the destination-reachable range; transmitting the modified forwarding data to the neighbor communication device; and adding to the destination-reachable range an additional destination-reachable range which has become capable of reaching the destination information processing device as a result of the modification of the forwarding data.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWING(S)

FIG. 1 gives an overview of a first embodiment;

FIG. 4 illustrates an example data structure of FDB stored in a switch;

FIG. 8 illustrates an example data structure of FDB memory;

FIG. 16 illustrates an example data structure of a route determination table;

FIG. 21 illustrates an example of a route determination table including neighbor switches added to reachable routes;

FIG. 27 illustrates an example data structure of a partial order number table;

FIG. 33 illustrates an example of a partial order number table; and

Figure 1:
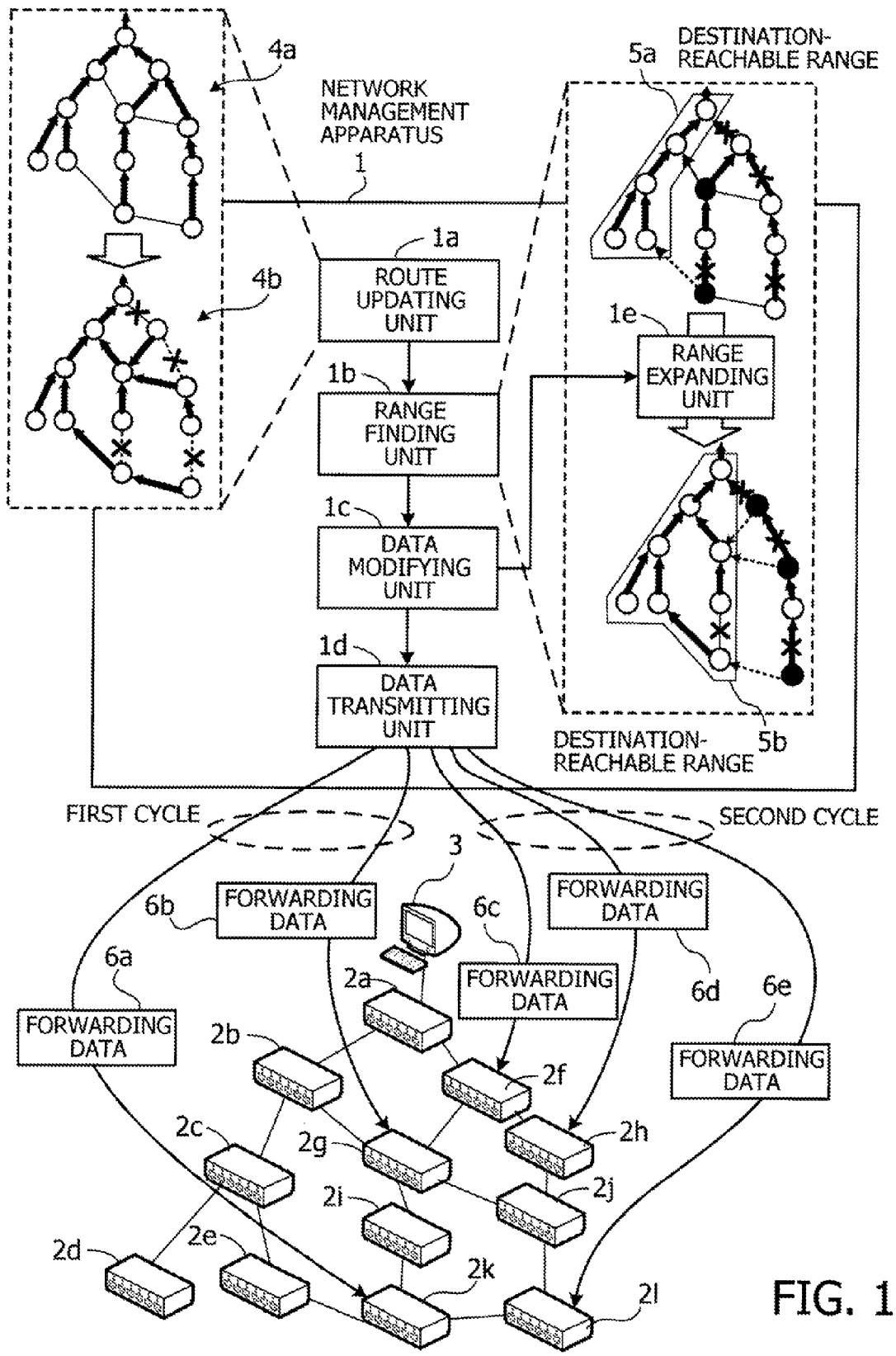

FIG. 34 gives an example of how the FDB changes in a switch F.

DESCRIPTION OF EMBODIMENT(S)

Embodiments of the present invention will be described below with reference to the accompanying drawings, wherein like reference numerals refer to like elements throughout.

First Embodiment

FIG. 1 gives an overview of a first embodiment. The illustrated network management apparatus 1 manages a plurality of communication devices 2a to 2l which forward packets based on forwarding data describing associations between destination addresses and output ports. The communication devices 2a to 2l may be, for example, layer-3 switches. Their forwarding data may be provided in the form of, for example, a forwarding database (FDB).

The network management apparatus 1 includes a route updating unit 1a, a range finding unit 1b, a data modifying unit 1c, a data transmitting unit 1d, and a range expanding unit 1e. The network management apparatus 1 stores information on the original routes 4a which have been produced from forwarding data of each communication device 2a to 2l. The route updating unit 1a changes the original routes 4a to new routes 4b in response to an event that influences existing forwarding routes of packets. For example, the route updating unit 1a may receive a message from a communication device which indicates that one of the output ports of that device is not operating properly. The reception of this notification message is construed as an event that invokes a change of packet forwarding routes. Accordingly, the route updating unit 1a changes the original routes 4a upon occurrence of such a route-changing event, thus building new routes 4b that can transport packets without using the failed output port. For example, the route updating unit 1a may trace operational links to find a route with the minimum number of hops.

When a specific destination address corresponding to an information processing device 3 is specified, the range finding unit 1b extracts partial routes that include at least a communication device 2a adjacent to that information processing device 3 and belong to both the original routes 4a before update and the new routes 4b after update. These partial routes are referred to as a destination-reachable range 5a, from which packets can reach the destination information processing device 3. It is noted that the communication device 2a is picked up out of the communication devices 2a to 2l under the network management apparatus 1 because it is where the destination information processing device 3 is attached to the network with no intervening communication devices therebetween. In other words, the communication device 2a is adjacent to the destination information processing device 3. Now that the destination-reachable range 5a is identified, the range finding unit 1b also extracts the remaining part of the network as a destination-unreachable range, from which no packets can reach the destination information processing device 3 at present.

As will be described later, the above-described destination-reachable range 5a may be expanded by the range expanding unit 1e with an additional destination-reachable range for the destination information processing device 3. When that is the case, and if at least one of the communication devices 2a to 2l is still out of the destination-reachable range, the range finding unit 1b reviews again the network in an attempt to determine an updated destination-reachable range 5b.

The data modifying unit 1c retrieves forwarding data stored in the network management apparatus 1. The data modifying unit 1c then modifies output port parameters in the retrieved forwarding data of a neighbor communication device which is located in the destination-unreachable range and adjacent to a communication device in the destination-reachable range 5a. This modification enables forwarding of packets from the neighbor communication device in the destination-unreachable range to its adjacent communication device in the destination-reachable range 5a. The neighbor communication device is located one hop away from that communication device in the destination-reachable range 5a.

The data modifying unit 1c may modify the forwarding data of relevant communication devices each time the range finding unit 1b finds a new version of destination-reachable range. This means that the aforementioned destination-reachable range 5b will also be subjected to the data modifying unit 1c when it is produced.

The data transmitting unit 1d transmits the modified forwarding data 6a to 6e to the communication devices. This transmission may be invoked each time the forwarding data of a communication device is modified by the data modifying unit 1c.

The range expanding unit 1e produces a new destination-reachable range 5b by giving an additional destination-reachable range to the existing destination-reachable range 5a when the destination information processing device 3 becomes reachable from more communication devices in the network as a result of modification of forwarding data. The range expanding unit 1e may execute this operation each time the data modifying unit 1c modifies forwarding data.

In operation of the above network management apparatus 1, the route updating unit 1a changes the original routes 4a to new routes 4b in response to an event that influences existing forwarding routes of packets. For an information processing device 3 specified with a specific destination address, the range finding unit 1b extracts partial routes representing a destination-reachable range 5a from which packets can be delivered to the destination information processing device 3. The partial routes include a communication device 2a adjacent to the destination information processing device 3 and belongs to both the original routes 4a and new routes 4b. The range finding unit 1b also extracts the remaining part of the network as a destination-unreachable range, from which no packets can reach the destination information processing device 3 at present. The data modifying unit 1c then modifies output port parameters in the forwarding data of a communication device in the destination-unreachable range when that communication device is adjacent to a communication device in the destination-reachable range 5a. This modification enables forwarding of packets from the former communication device to the latter communication device. Referring to FIG. 1, for example, there are two communication devices 2g and 2k in the destination-unreachable range which are adjacent to communication devices in the destination-reachable range. Accordingly, the data modifying unit 1c modifies forwarding data of those two communication devices 2g and 2k.

The above modification of forwarding data invokes a first cycle of forwarding data transmission. That is, the data transmitting unit 1d transmits the modified forwarding data to their corresponding communication devices. Specifically, the forwarding data 6a and 6b has been modified and sent to their corresponding communication devices 2g and 2k, thus completing the first cycle of forwarding data transmission.

Now that the range expanding unit 1e has modified the forwarding data to expand the destination-reachable range 5a, the range finding unit 1b then identifies a new destination-reachable range 5b, as well as its corresponding destination-unreachable range. Some communication devices in this new destination-unreachable range may be adjacent to those in the new destination-reachable range 5b. If such communication devices are found, the data modifying unit 1c modifies their forwarding data so as to enable delivery of packets from those apparatuses to the destination information processing device 3. In the present example of FIG. 1, there are three such communication devices 2f, 2h, and 2l. The data transmitting unit 1d thus sends the communication devices 2f, 2h, and 2l their modified forwarding data 6c, 6d, and 6e, respectively.

The destination-reachable range 5b of packets has been expanded as a result of the modification made by the range expanding unit 1e to forwarding data. In the example of FIG. 1, the modified forwarding data 6c, 6d, and 6e are sent to their corresponding communication devices 2f, 2h, and 2l. Accordingly, the resulting destination-reachable range now includes all communication devices 2a to 2l. In other words, every communication device in the network can send packets to the destination information processing device 3.

As can be seen from the above, the present embodiment gradually expands the range that can reach the information processing device 3 specified by a destination address, by sending updated forwarding data to destination-unreachable communication devices adjacent to destination-reachable communication devices in a stepwise manner. These feature of the present embodiment enables updating the forwarding routes of packets without producing any loops.

That is, when a packet addressed to the destination information processing device 3 is received, destination-reachable communication devices do not forward it to other communication devices in the destination-unreachable range. It is therefore ensured that no loops are produced by updating forwarding data of a destination-unreachable communication device adjacent to a destination-reachable communication device. Gradual expansion of the destination-reachable range will finally cover all communication devices 2a to 2l as seen in FIG. 1. Accordingly, the proposed network management apparatus 1 can change the original routes 4a to new routes 4b without introducing any loops in the middle of the updating process, so that the resulting new routes 4b allow the communication devices 2a to 2l to forward packets to the destination information processing device 3.

The above-described loop prevention method contributes greatly to reliable operations of a communication network for the following reason. As the network size grows, it takes a longer time to update FDBs in all switches. For example, one switch consumes 100 ms at maximum, from reception of an FDB update command to transmission of a completion notice. The update should be applied sequentially because simultaneous FDB update commands issued to many switches could render the network unstable. Sequential update with a series of control packets, however, prolongs the life of a switching loop if produced. As long as the loop continues, the network keeps unable to deliver packets correctly, thus leading to quality degradation in network services. Stated reversely, the service quality can be improved by preventing loops.

As described earlier, the foregoing route updating unit 1a is responsive to an event such as reception of a failure notification message. Another example of route-changing events is a user input that indicates a point at which the network is to be disconnected for the purpose of maintenance. Yet another example is a route change command for the purpose of performance tuning.

Second Embodiment

A second embodiment will now be described below with reference to FIGS. 2 to 23, assuming the case where an InfiniBand™ network encounters a failure and consequent loss of some packet routes.

Figure 2:
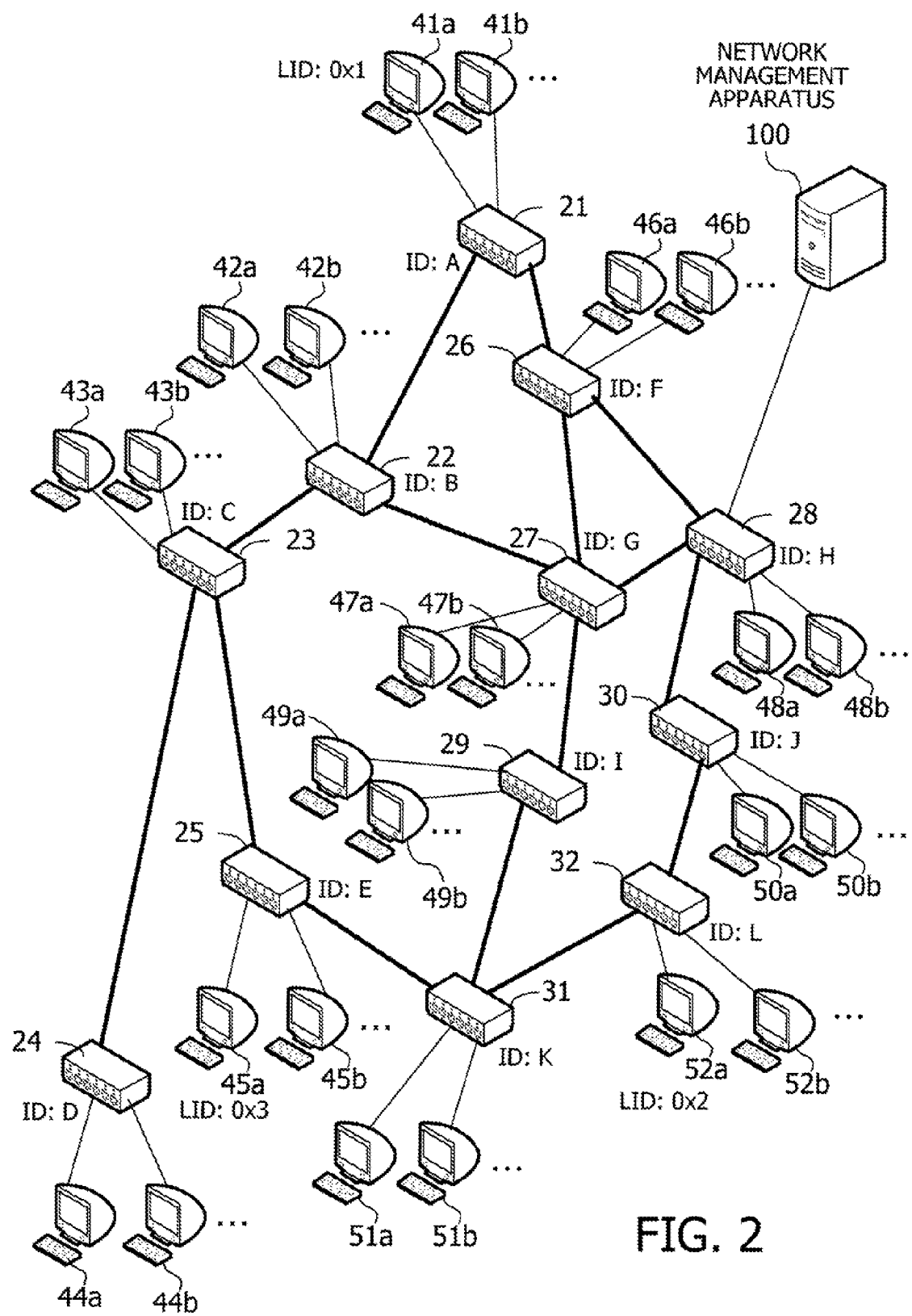
FIG. 2 illustrates an example system configuration according to a second embodiment.

FIG. 2 illustrates an example system configuration according to the second embodiment. As can be seen from FIG. 2, a network is formed from a plurality of switches 21 to 32 linked to each other by using high-speed communication cables. Specifically, a switch 21 is linked to switches 22 and 26. The switch 22 is further linked to switches 23 and 27. The switch 23 is further linked to switches 24 and 25. The switch 25 is further linked to a switch 31. The switch 26 is further linked to switches 27 and 28. The switch 27 is further linked to switches 28 and 29. The switch 28 is further linked to a switch 30. The switch 29 is further linked to a switch 31. The switches 30 and 31 are further linked to a switch 32.

Those switches 21 to 32 have their own identifiers (IDs) to uniquely distinguish themselves from each other. Specifically, the switch 21 has an ID of "A." The switch 22 has an ID of "B." The switch 23 has an ID of "C." The switch 24 has an ID of "D." The switch 25 has an ID of "E." The switch 26 has an ID of "F." The switch 27 has an ID of "G." The switch 28 has an ID of "H." The switch 29 has an ID of "I." The switch 30 has an ID of "J." The switch 31 has an ID of "K." The switch 32 has an ID of "L."

Computers are attached to the switches 21 to 32 to communicate data with each other via the network. Those computers are referred to herein as "nodes." Specifically, nodes 41a, 41b, . . . are connected to the switch 21. Nodes 42a, 42b, . . . are connected to the switch 22. Nodes 43a, 43b, . . . are connected to the switch 23. Nodes 44a, 44b, . . . are connected to the switch 24. Nodes 45a, 45b, . . . are connected to the switch 25. Nodes 46a, 46b, . . . are connected to the switch 26. Nodes 47a, 47b, . . . are connected to the switch 27. Nodes 48a, 48b, . . . are connected to the switch 28. Nodes 49a, 49b, . . . are connected to the switch 29. Nodes 50a, 50b, . . . are connected to the switch 30. Nodes 51a, 51b, . . . are connected to the switch 31. Nodes 52a, 52b, . . . are connected to the switch 32.

Each switch 21 to 32 forwards packets from one port to another port according to their respective destinations. With this forwarding operation at individual switches 21 to 32, packets produced at a source node are transported to a specified destination node.

Each node is assigned an identifier, LID, for use in communication. The node 41a, for example, has an LID of 0x1. The node 52a has an LID of 0x2, and the node 45a has an LID of 0x3. The destination of a packet is specified by a destination LID (DLID). The network is supposed to deliver packets with a specific DLID to the node having an LID with the same value as the DLID.

The switches 21 to 32 maintain their own forwarding data, or forwarding database (FDB), that associates output ports with DLIDs of packet destinations. When a packet is received with a specific DLID, the FDB indicates to which port the packet should be directed. The switches 21 to 32 thus looks up their FDB to determine which output port to use to forward the received packet.

The FDB in each switch 21 to 32 is configured by an entity called "subnet manager" (SM). When a problem (e.g., port failure) arises in some portion of the network, a local subnet manager detects the problem and notifies the network management apparatus 100 of its details (e.g., port number of the failed port). The subnet manager then rewrites the routing configuration in its local FDB according to commands from the network management apparatus 100 so as to avoid the failed portion of the network.

As the system illustrated in FIG. 2 performs such FDB-based routing of packets, it is possible to provide communication paths other than spanning-tree paths by appropriately configuring FDB of each switch to satisfy the network's bandwidth and redundancy requirements. This flexibility may, on the other hand, pose a risk of unintentionally producing a switching loop due to some mistake in setting up the FDB.

In addition to serving its local nodes 48a and 48b, the switch 28 also accommodates a network management apparatus 100, which is a computer deployed for the purpose of operating and managing the entire network. For example, the network management apparatus 100 determines an appropriate forwarding route of packets for each different destination and sends the resulting information to switches 21 to 32 constituting the network. When the network encounters an event (e.g., failure) that affects some existing routes of packets, the network management apparatus 100 modifies the original packet forwarding routes and sends the result to the switches 21 to 32. Each switch reconfigures itself so that packets can be delivered to their destinations via the new routes specified by the network management apparatus 100.

When distributing new routes, the network management apparatus 100 sends updated FDB to the switches 21 to 32 in an appropriate order, not to produce a loop during the course of updating the routes. The switches 21 to 32 store their respective FDBs in a rewritable memory device. Each switch 21 to 32 forwards packets according to the stored records of FDB.

Figure 3:
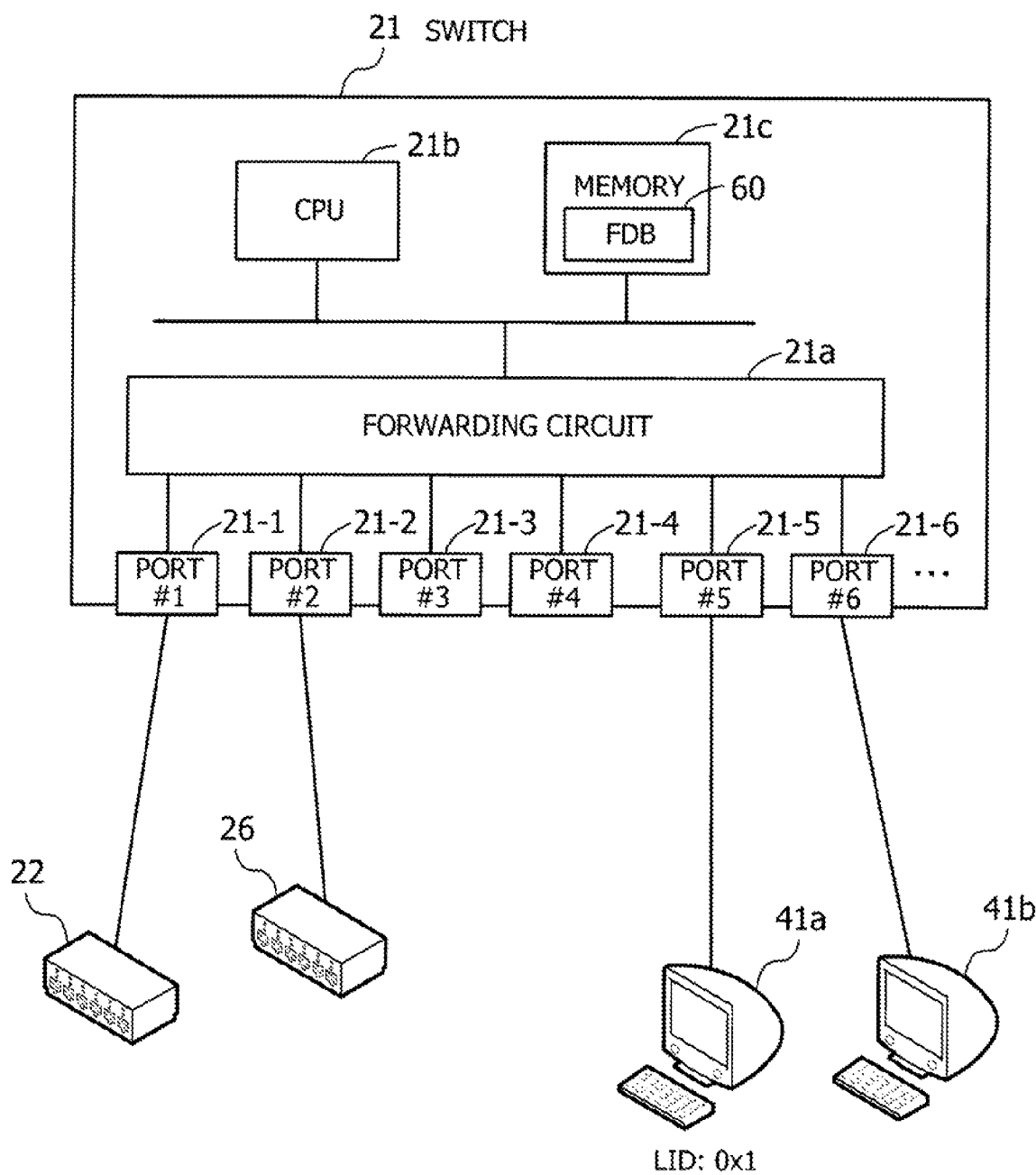
FIG. 3 illustrates a hardware configuration of switches.

FIG. 3 illustrates a hardware configuration of switches. Specifically, the illustrated switch 21 has a plurality of ports 21-1, 21-2, 21-3, 21-4, 21-5, 21-6, . . . for connection of communication cables, each of which is given a port number for distinction. In the example of FIG. 3, a peer switch 22 is connected to port #1 21-1. Likewise, another peer switch 26 is connected to port #2 21-2. Also, two nodes 41a and 41b are connected to port #5 21-5 and port #6 21-6, respectively.

Inside the switch 21, the ports 21-1, 21-2, 21-3, 21-4, 21-5, 21-6, . . . are wired to a forwarding circuit 21a. When a packet arrives at a port, this forwarding circuit 21a selects an output port for that packet according to its destination and directs it to the selected port.

A central processing unit (CPU) 21b and memory 21c are coupled to the forwarding circuit 21a for the purpose of its management. While not illustrated in FIG. 3, the memory 21c contains a program that the CPU 21b executes to provide functions of a subnet manager. The subnet manager functions may include, for example, operation monitoring and configuration of the switch 21. More specifically, the CPU 21b watches the communication activity at each port 21-1, 21-2, 21-3, 21-4, . . . and notifies the network management apparatus 100 of a failure, if any, by sending control packets. The CPU 21b may also receive from the network management apparatus 100 a request for information about operating condition of the switch 21. When this is the case, the CPU 21b produces a control packet indicating the current operating condition, including failure information, of the switch 21 and sends it back to the network management apparatus 100. Also, the CPU 21b updates its local FDB when so instructed by the network management apparatus 100.

The memory 21c is a rewritable data storage device such as a semiconductor memory device. The memory 21c contains an FDB 60. When a new version of FDB is received from the network management apparatus 100, the CPU 21b updates the current FDB 60 in the memory 21c with the new one. The forwarding circuit 21a consults the FDB 60 to determine which port to use to forward received packets.

FIG. 4 illustrates an example data structure of FDB stored in a switch. The illustrated FDB 60 is formed from a plurality of output port setup tables 61, 62, . . . , one for each 64 DLIDs. Each output port setup table 61, 62, . . . has a DLID field and an output port field. The field values arranged in the horizontal direction are associated with each other, thus constituting a single record of the tables.

The DLID field contains an LID of a node which may be specified as the destination of packets. The output port field contains a port number corresponding to the packet destination seen in the DLID field, thus indicating which port should be used to forward packets to that destination. The output port field may be given a value of 0xff in the case where no output port is assigned to the corresponding DLID. When a received packet has that kind of DLID, the switch 21 discards the packet since the FDB 60 returns 0xff to indicate the absence of valid output port. Generally, this output port number 0xff is used for the DLIDs representing unused LIDs, or non-existing nodes.

While FIG. 3 illustrates only one switch 21, the other switches 22 to 32 also have the same or similar hardware configuration. The data structure of the FDB 60 discussed in FIG. 4 is applied, not only to the illustrated switch 21, but also to the other switches 22 to 32.

The following will now describe the functions of a network management apparatus 100 in greater detail.

Figure 5:
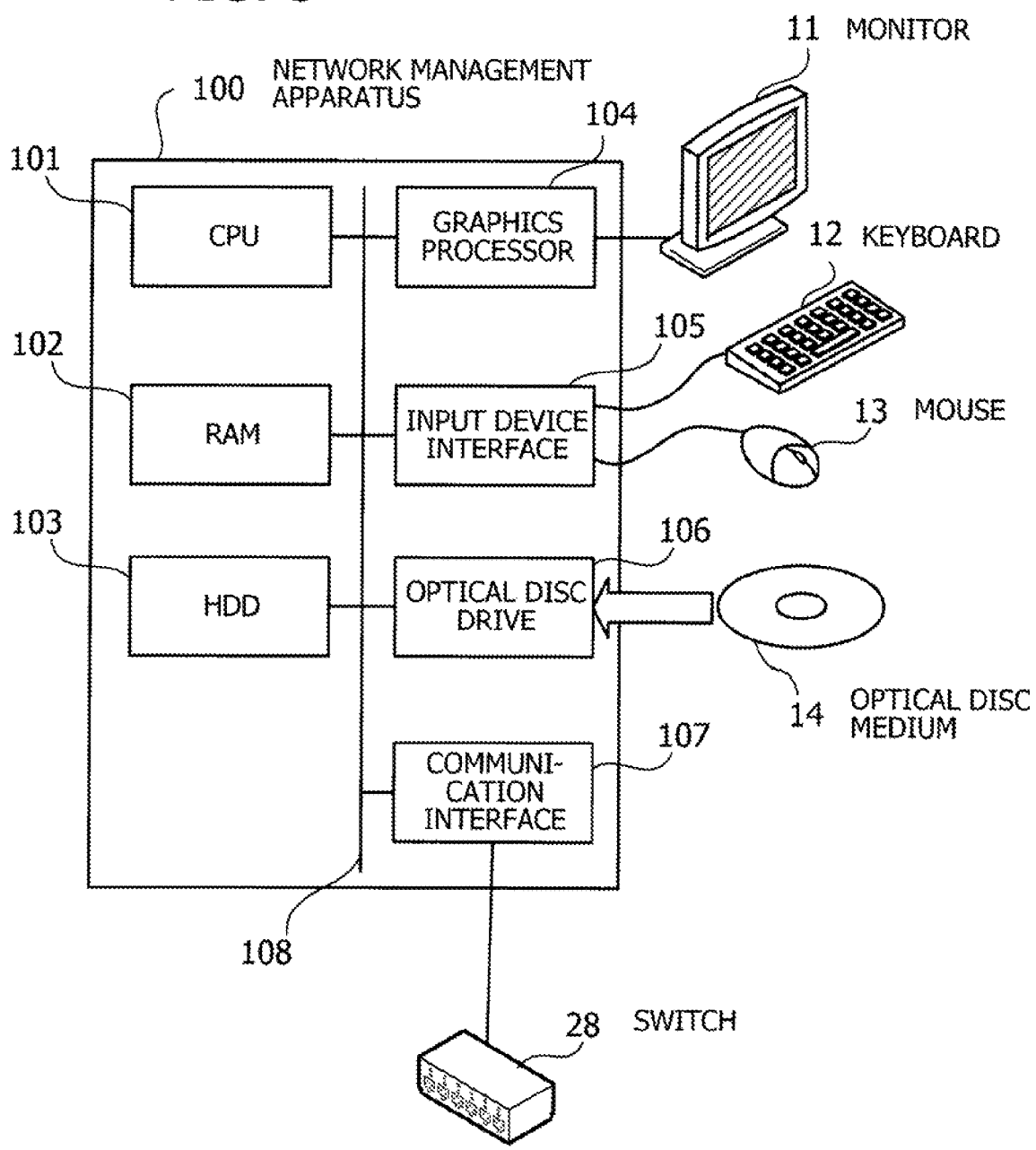
FIG. 5 illustrates an example hardware configuration of a network management apparatus.

FIG. 5 illustrates an example hardware configuration of a network management apparatus. This network management apparatus 100 contains a CPU 101 to control the entire system of the apparatus. The CPU 101 is connected to a random access memory (RAM) 102 and a plurality of peripheral devices via a bus 108.

The RAM 102 serves as main storage of the network management apparatus 100, which temporarily stores the whole or part of operating system (OS) programs and application programs that the CPU 101 executes. The RAM 102 also stores other various data objects that the CPU 101 manipulates at runtime.

The peripheral devices on the bus 108 include a hard disk drive (HDD) 103, a graphics processor 104, an input device interface 105, an optical disc drive 106, and a communication interface 107. The HDD 103 contains magnetic discs to read and write data. The HDD 103 is used as secondary storage of the network management apparatus 100, which stores program and data files of the operating system and applications. For use as secondary storage, this HDD 103 may be replaced with flash memory or other type of semiconductor memory devices.

The graphics processor 104 produces video images according to drawing commands supplied from the CPU 101 and displays them on the screen of a monitor 11 coupled thereto. The monitor 11 may be a cathode ray tube (CRT) display, a liquid crystal display, or other type of display device.

The input device interface 105 is used to receive signals from external input devices, such as a keyboard 12 and a mouse 13. Those input signals are supplied to the CPU 101. The mouse 13 serves here as a pointing device, and it may thus be replaced with other devices for the same purpose. Alternative pointing devices include touchscreen, tablet, touchpad, and trackball, for example.

The optical disc drive 106 reads data recorded on an optical disc medium 14 by using, for example, a laser. The optical disc medium 14 is a portable storage medium storing data on its surface. The data can be accessed by illuminating the data path with a light and detecting its reflection. Such optical disc media 14 include digital versatile discs (DVD), DVD-RAM, compact disc read-only memory (CD-ROM), CD-Recordable (CD-R), and CD-Rewritable (CD-RW), for example.

The communication interface 107 is linked to a switch 28 via a communication cable. Through this switch 28, the communication interface 107 exchanges control packets with other switches 21 to 32 on the network, thus permitting the CPU 101 to communicate data.

The above-described hardware system serves as a platform for realizing the processing functions of the present embodiment and other embodiments described later.

Figure 6:
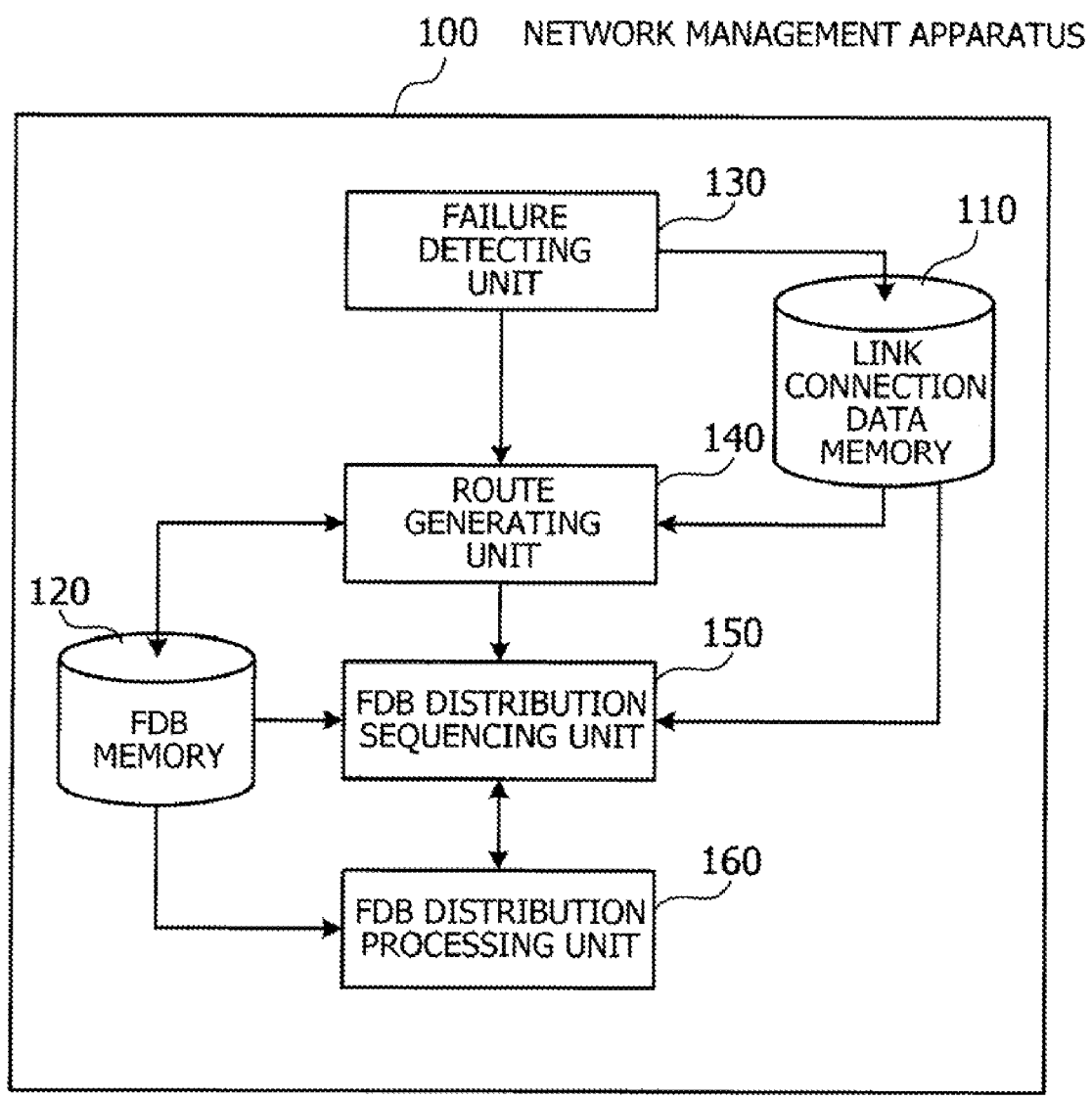
FIG. 6 is a functional block diagram of a network management apparatus.

FIG. 6 is a functional block diagram of a network management apparatus. The illustrated network management apparatus 100 includes the following functional elements: a link connection data memory 110, an FDB memory 120, a failure detecting unit 130, a route generating unit 140, an FDB distribution sequencing unit 150, and an FDB distribution processing unit 160.

The link connection data memory 110 stores link connection data which describes how the communication cables are run to interconnect switches 21 to 32 in the network. Specifically, a part of the storage space of RAM 102 or HDD 103 is allocated for use as this link connection data memory 110.

The FDB memory 120 stores FDBs for delivery to the switches. Specifically, a part of the storage space of RAM 102 or HDD 103 is allocated for use as this FDB memory 120.

The failure detecting unit 130 recognizes a failure of the network. For example, the failure detecting unit 130 receives a failure-indicating control packet from a switch and locates the problem from the content of the received packet. The failure detecting unit 130 also sends control packets regularly to each switch 21 to 32 to request information about their operation status, so that a failure can be detected from their responses to those packets. For example, when a communication failure is detected in a switch-to-switch link, the failure detecting unit 130 notifies the route generating unit 140 of that communication failure, besides making access to the link connection data memory 110 to record the failure.

The route generating unit 140 produces routing data for each specific node attached to the switches 21 to 32 on the network. This routing data indicates which forwarding route should be taken to deliver packets to their destination node. Upon receipt of a failure notice from the failure detecting unit 130, the route generating unit 140 grasps the problem situation of switch-to-switch communication, while making access to the link connection data memory 110 to consult the stored link connection data of switches. The route generating unit 140 then produces new routing data that permits packets to reach their destinations via operable communication links. Based on this routing data, the route generating unit 140 creates FDBs for the purpose of updating those in the individual switches and saves them in the FDB memory 120. Note that the FDB memory 120 still contains the previous version of FDBs, which were distributed to the switches 21 to 32. The route generating unit 140 does not discard that version of FDBs, but keeps them in the FDB memory 120 as a record of the initial state of routing paths.

Now that the route generating unit 140 has produced new routes, as well as new FDBs corresponding thereto, the FDB distribution sequencing unit 150 determines in what order those databases should be distributed to individual switches 21 to 32. More specifically, the FDB distribution sequencing unit 150 first selects a specific destination node and then identifies which routes in the current routes can reach the selected destination node, by searching the link connection data memory 110 and FDB memory 120. The routes identified by this search are referred to as destination-reachable routes. Subsequently, the FDB distribution sequencing unit 150 extracts switches adjacent to any of the switches on those destination-reachable routes and notifies the FDB distribution processing unit 160 of the extracted switches as a target of FDB distribution. The FDB distribution processing unit 160 distributes FDBs to those target switches. The FDB distribution sequencing unit 150 then seeks a route reaching a newly selected destination node, thus extracting another set of target switches adjacent to those on the destination-reachable routes. The FDB distribution sequencing unit 150 notifies the FDB distribution processing unit 160 of those target switches, together with DLID of the destination node.

When a set of switches are specified as a target of FDB distribution, the FDB distribution processing unit 160 produces and sends control packets to those target switches, thereby distributing new FDBs indicating output ports for forwarding packets addressed to the selected node. Each receiving switch updates its local database and notifies the FDB distribution processing unit 160 of the completion of update. The FDB distribution processing unit 160 passes those responses to the FDB distribution sequencing unit 150.

Figure 7:
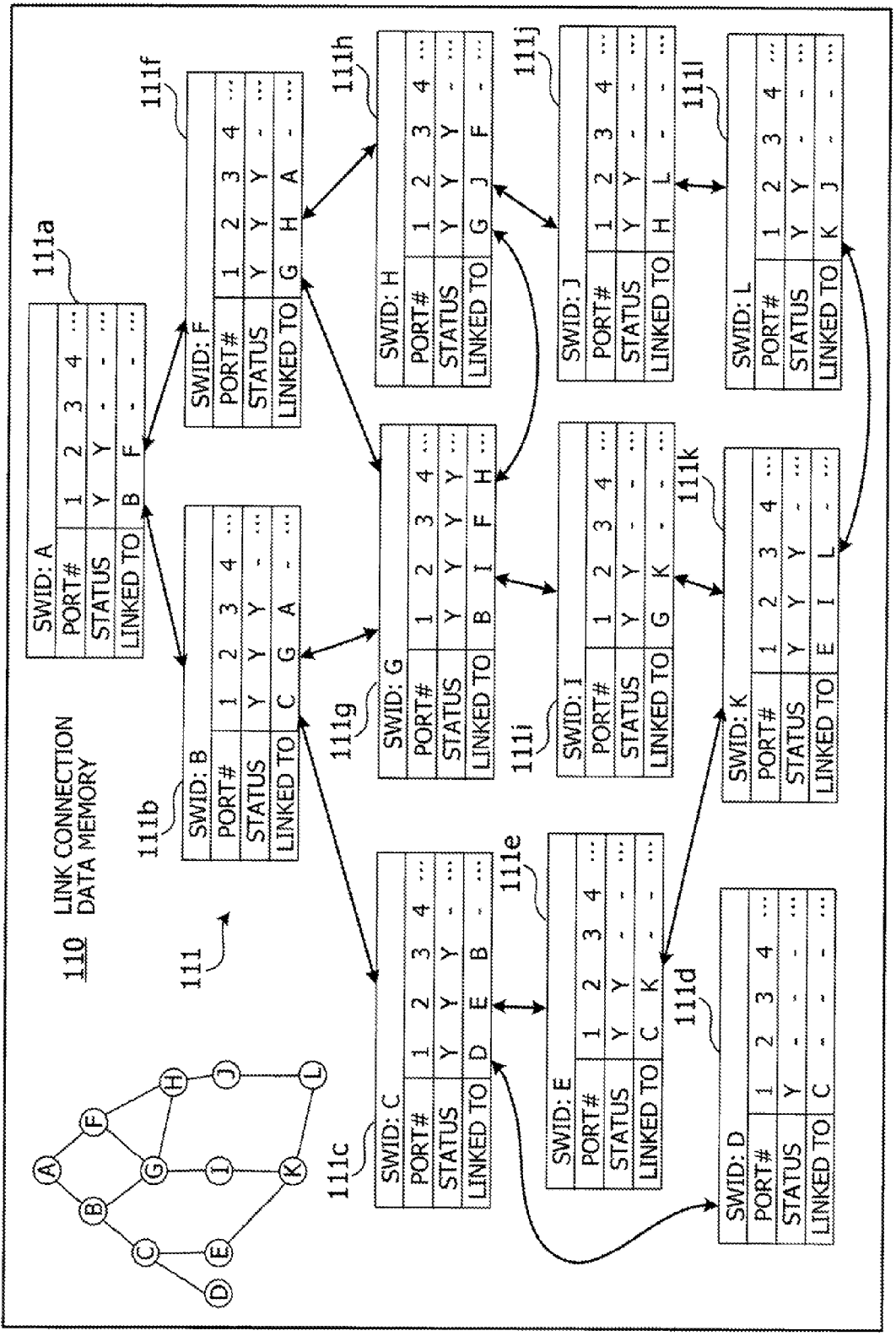
FIG. 7 illustrates an example data structure of link connection data.

FIG. 7 illustrates an example data structure of link connection data 111 stored in the link connection data memory 110. The illustrated link connection data 111 is a collection of switch management records 111a to 111l. Each switch management record 111a to 111l includes a switch ID (SWID) and port numbers (port #) and describes the status and link destination of each port. The status field of each port contains a value of "Y" or "N" to indicate that the port is operating or not operating for network connection, respectively. The linked-to field contains switch IDs indicating to which switch each port is linked via a communication cable. While not specifically illustrated in FIG. 7, the linked-to field may also contain LIDs of nodes (or information processing devices). Thus the linked-to field similarly indicates to which node, if any, those ports are linked.

The above-described switch management records 111a to 111l constitute a set of link connection data 111, enabling the network management apparatus 100 to recognize the current state of link connections in the network of FIG. 2.

FIG. 8 illustrates an example data structure of the FDB memory 120 which stores FDBs 121 to 126 and more for different switches 21 to 32. Each FDB is formed from a plurality of tables each containing 64 entries of DLID. This data structure is similar to that of the foregoing FDB 60 (see FIG. 4) stored in the switch 21.

When the network encounters a failure, the above-described network management apparatus 100 modifies routing data for each destination of packets. The network management apparatus 100 then distributes the modified FDBs to relevant switches 21 to 32 in an appropriate order, not to produce a loop during the course of updating the routes.

Figure 9:
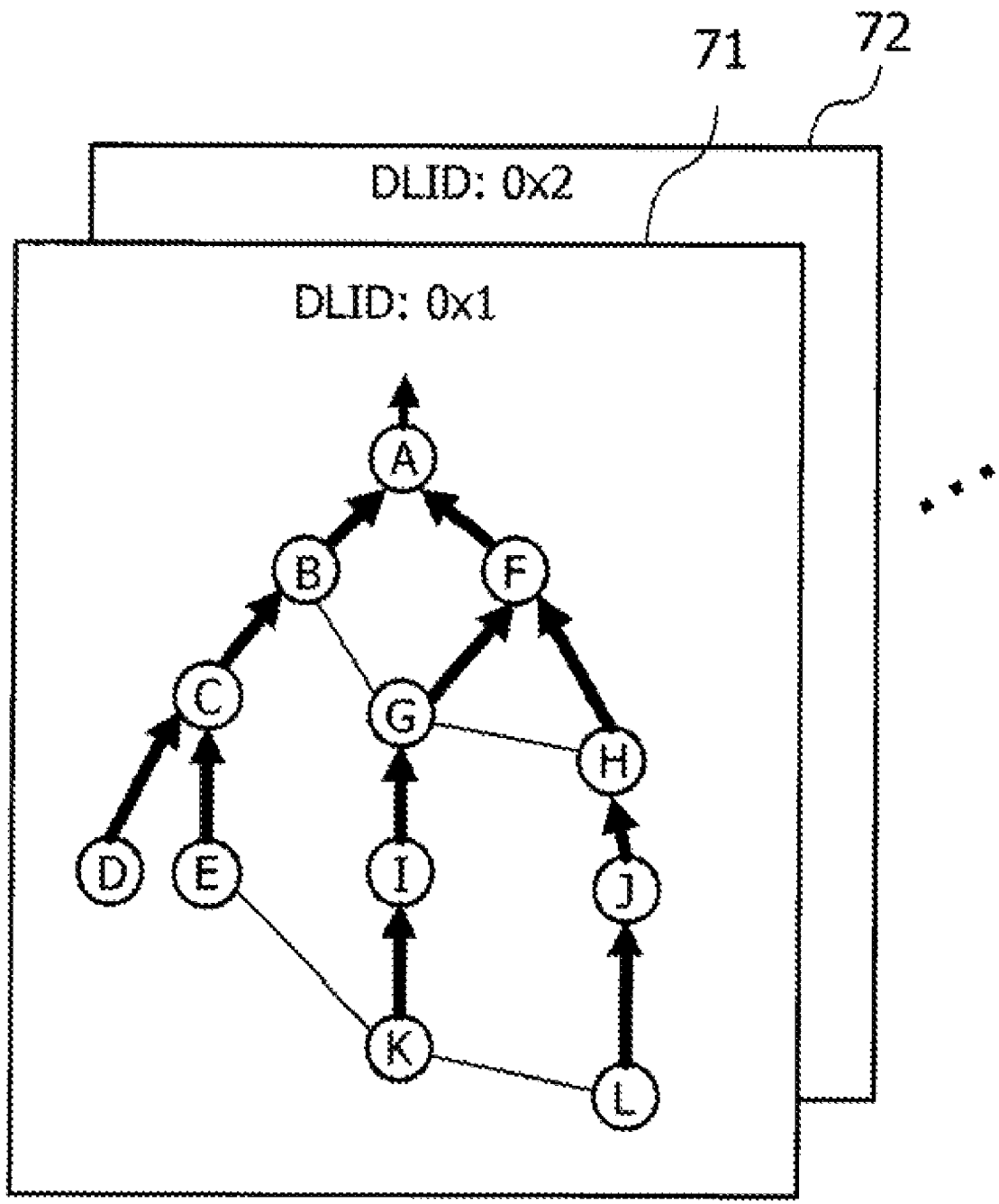
FIG. 9 is a conceptual view of routing data.

As discussed in the explanation of FIG. 6, it is the route generating unit 140 that produces routing data in the case of failure or the like. The route generating unit 140 performs its task on the basis of link connection data 111 stored in the link connection data memory 110, as well as FDBs 121 to 126 stored in the FDB memory 120. FIG. 9 is a conceptual view of routing data. Routing data 71, 72, . . . is created for each particular DLID to describe which link connections are used to deliver packets from switches 21 to 32 on the network to the destination node that is identified by that DLID. In the example illustrated in FIG. 9, the alphabets in a circle represent the IDs of corresponding switches, and the bold arrows indicate the direction of packets forwarded by those switches. Some of the circles (switches) are connected by thin lines. This indicates that there is a physical link between switches, but it is not used to transport packets.

Such routing data 71, 72, . . . can be produced from the link connection data 111 discussed in FIG. 7 in conjunction with FDB of each switch. More specifically, the route generating unit 140 first consults the link connection data 111 to identify active connections between switches. Then the route generating unit 140 selects a specific DLID and finds output ports associated with the selected DLID by consulting each FDB stored in the FDB memory 120. Based again on the link connection data 111, the route generating unit 140 then identifies other switches linked from the found output ports. The switches are supposed to use those output ports to transmit packets toward the node specified by the selected DLID. The route generating unit 140 thus compiles the selected DLID and its corresponding output port of each relevant switch into routing data.

The routing data 71, 72, . . . indicates the current state of the network connection, which the route generating unit 140 produces and saves in RAM 102 or HDD 103 when, for example, the network management apparatus 100 distributes FDBs to switches 21 to 32. As an example data structure, the routing data 71, 72, . . . may take the form of, for example, a directed graph. The route generating unit 140 may be configured to produce routing data from the original link connection data 111 and FDBs 121 to 126 each time the distribution order of FDBs is determined.

Figure 10:
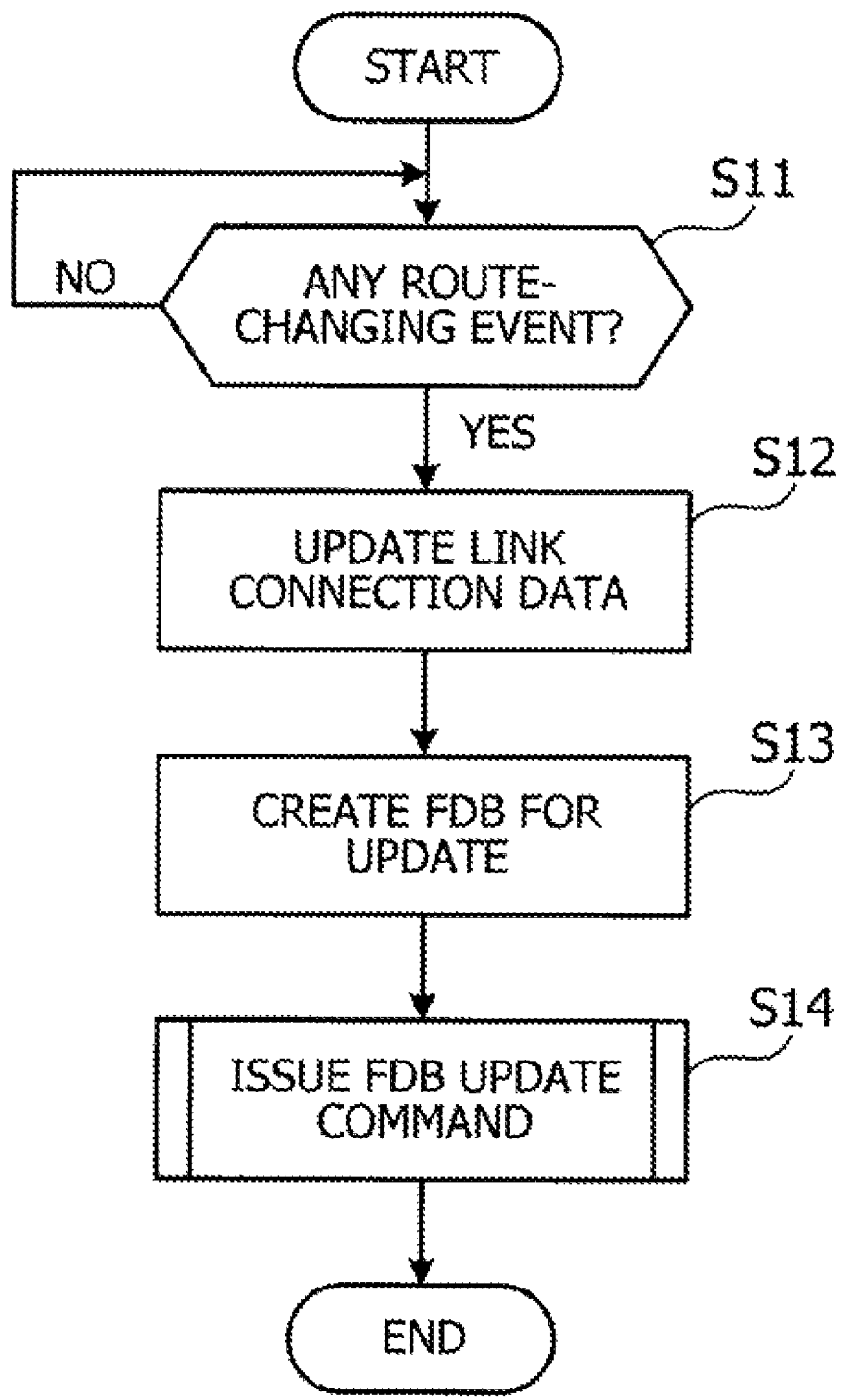
FIG. 10 is a flowchart illustrating a process of changing routes according to the second embodiment.

The packet forwarding routes represented by the above-described routing data may be changed upon occurrence of an event that invokes a route change, as will be described in detail below. FIG. 10 is a flowchart illustrating a process of changing routes according to the second embodiment. The overview of this process will be described below in the order of step numbers.

(Step S11) The failure detecting unit 130 determines whether there is any event that invokes a route change. One example of such a route-changing event is when a control packet indicating failure is received from a switch. Such control packets contain ID of the switch that has detected failure, as well as a port number indicating at which port the communication has disrupted. Another example is when the failure detecting unit 130 receives a control packet indicating recovery of a failed link. In response to those route-changing events, the process proceeds to step S12. Otherwise, step S11 is repeated.

(Step S12) The failure detecting unit 130 updates link connection data 111. In the case where this step S12 has been reached due to a communication failure, the failure detecting unit 130 consults link connection data 111 in the link connection data memory 110 to seek switch management records of the switches involved in the disrupted communication route. The failure detecting unit 130 then updates the found switch management records by setting a non-operating state to relevant ports.

(Step S13) Based on the updated link connection data, the route generating unit 140 determines a new forwarding route for each destination node of packets and thus produces a new set of FDBs for update in relevant switches 21 to 32. The route generating unit 140 saves the produced FDBs in the FDB memory 120, separately from the existing set of FDBs with which the switches 21 to 32 have been operating. Here the route generating unit 140 gives different version information to the two sets of databases (i.e., pre-update FDB and post-update FDB) to make them distinguishable from each other. The route generating unit 140 may also add time stamps indicating their creation dates to achieve that purpose.

(Step S14) The FDB distribution sequencing unit 150 and FDB distribution processing unit 160 work together to command each switch 21 to 32 to execute an FDB update. The details of this step will be described later with reference to FIG. 13.

Figure 11:
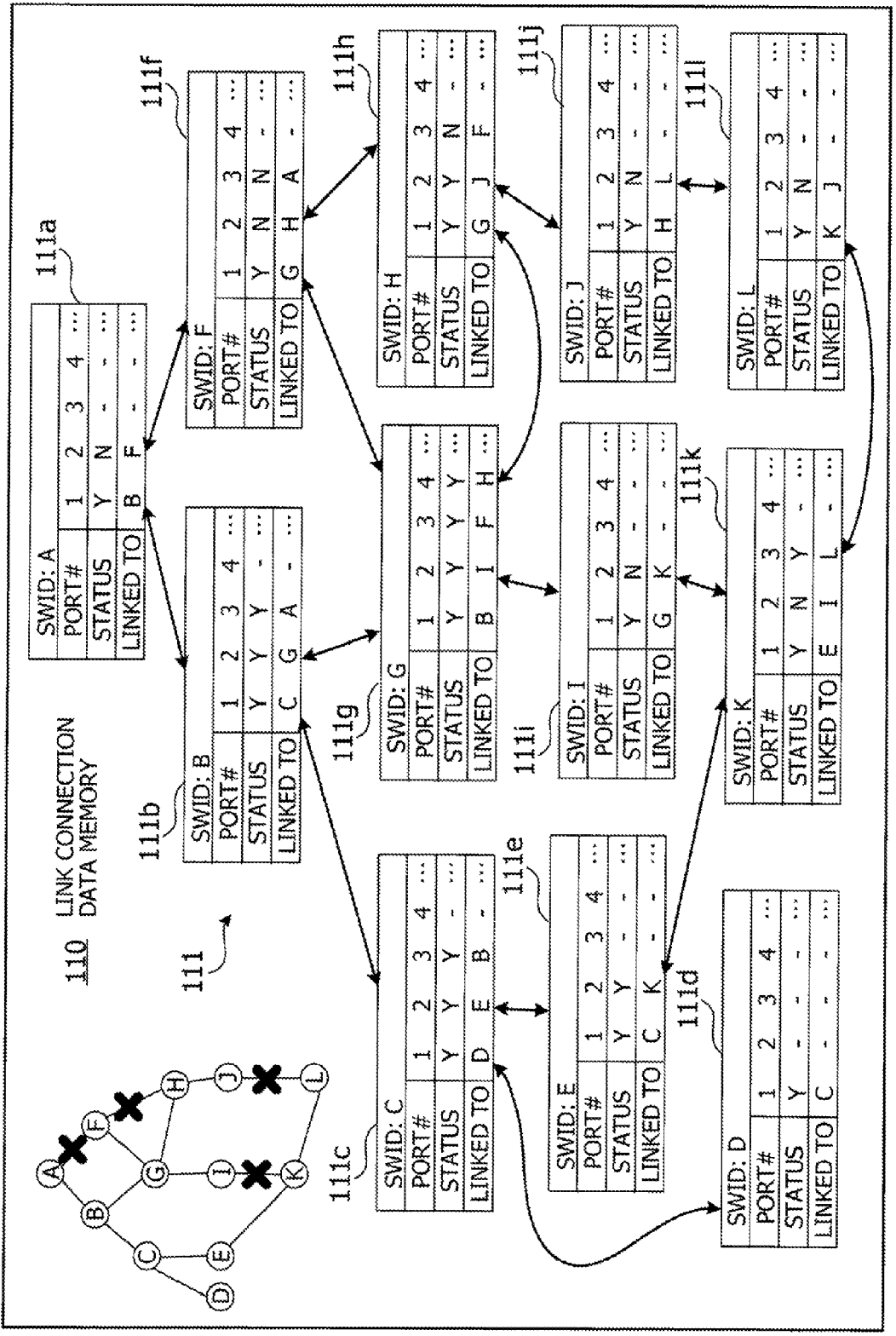
FIG. 11 illustrates an example of updated link connection data.

Referring now to FIG. 11, an example of updated link connection data in the case of failure will be discussed below. The example illustrated in FIG. 11 assumes four link failures. The first link failure has occurred between switch A 21 and switch F 26. The second link failure has occurred between switch F 26 and switch H 28. The third failure has occurred between switch I 29 and switch K 31. The fourth failure has occurred between switch J 30 and switch L 32. Those link failures have changed the port status field of link connection data 111 from "Y" (operating) to "N" (not operating) at both ends of each failed link. In response to the change in the link connection data 111, the route generating unit 140 seeks alternative forwarding routes of packets and updates the routing data accordingly.

Figure 12:
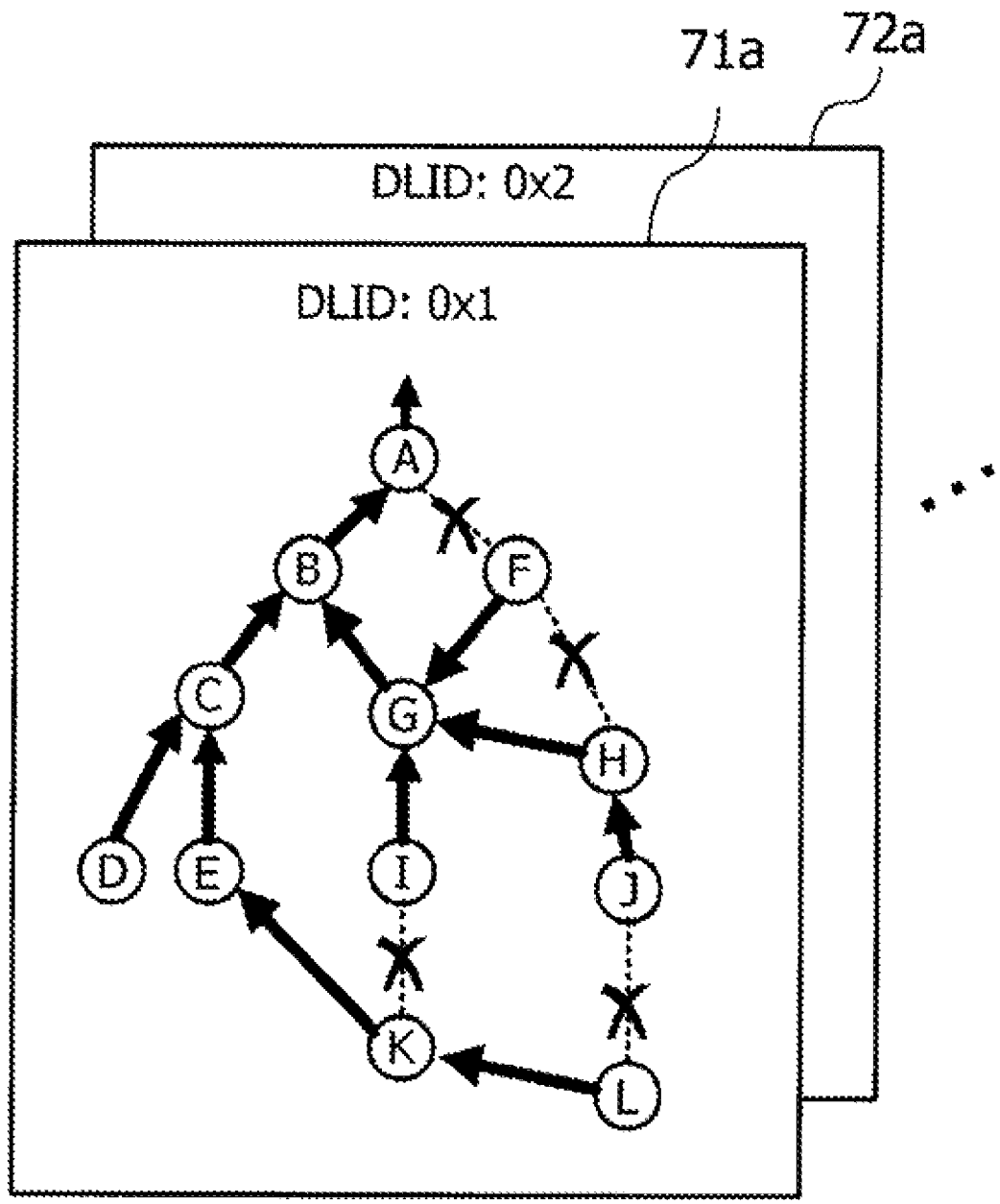
FIG. 12 illustrates an example of updated routing data.

FIG. 12 illustrates an example of updated routing data. The illustrated routing data 71a, 72a, . . . are an updated version of routing data, each data indicating new forwarding routes for a specific destination node. For example, the updated routing data 71a indicates forwarding routes reaching the node identified by a DLID of 0x1. This updated routing data 71a may be compared with the original routing data 71 (FIG. 9). As can be seen from the comparison, the forwarding direction of packets has been changed at four switches. More specifically, switch F 26 is now configured to forward packets with a DLID of 0x1 to switch G 27, instead of switch A 21. Switch G 27 is now configured to forward the same to switch B 22, instead of switch F 26. Switch H 28 is now configured to forward the same to switch G 27, instead of switch F 26. Switch K 31 is now configured to forward the same to switch E 25, instead of switch I 29. Switch L 32 is now configured to forward the same to switch K 31, instead of switch J 30.

Figure 13:
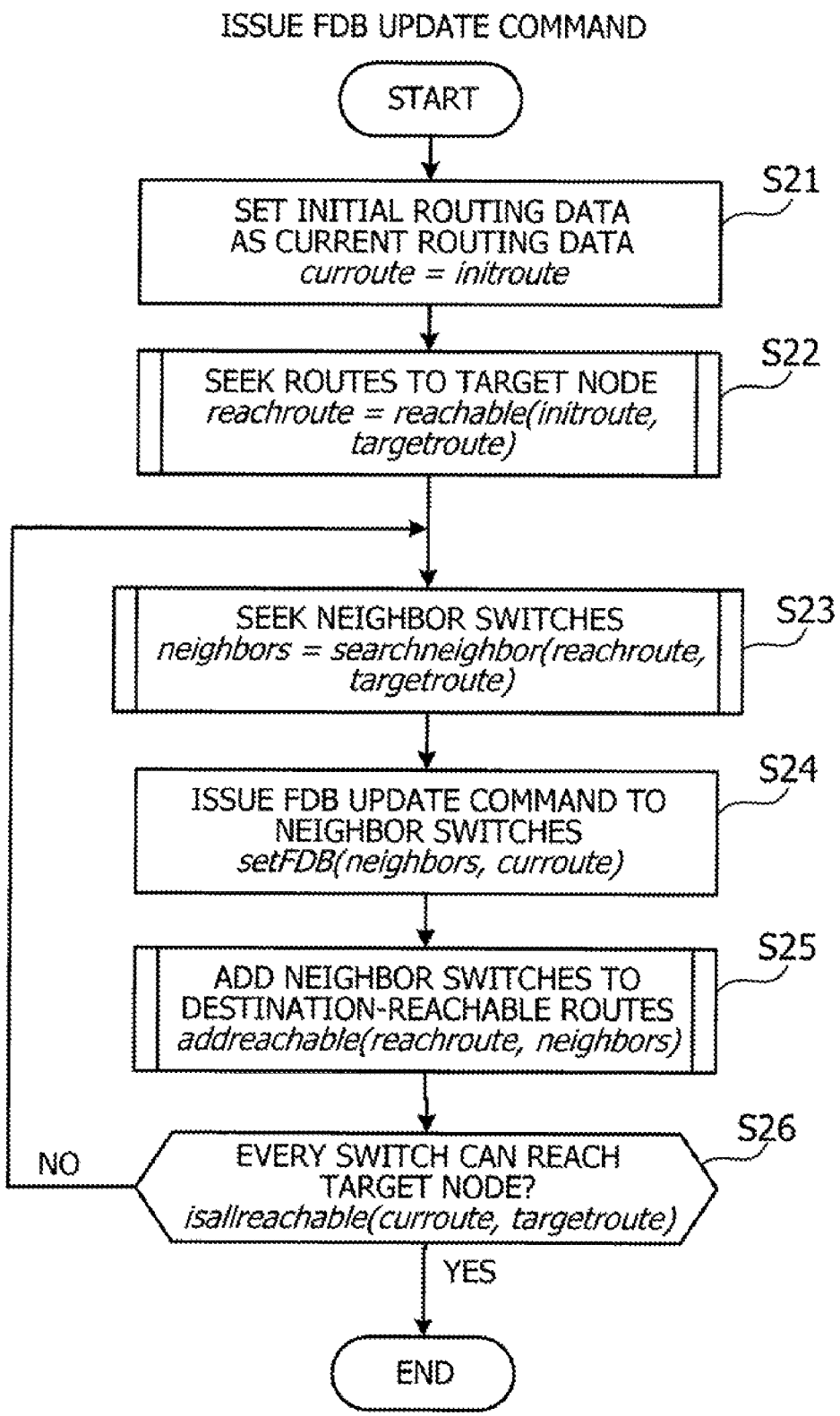
FIG. 13 is a flowchart illustrating a process of issuing FDB update commands.

Subsequent to the above-described update of routing data, each relevant switch 21 to 32 receives an FDB update command. FIG. 13 is a flowchart illustrating a process of issuing FDB update commands. It is noted that the illustrated process is executed for each prospective destination node of packets, the node being referred to herein as "target node." The processing steps constituting this process will be described below in the order of step numbers.

(Step S21) The FDB distribution sequencing unit 150 assigns initial routing data for the specified target node as current routing data. Here the term "initial routing data" refers to the routing data that has been valid in the switches 21 to 32 since previous distribution of FDB. This operation is executed as an instruction of, for example, "curroute=initroute" in a computer program. Here, "curroute" is a variable representing current routing data, "initroute" is a variable representing initial routing data, and "=" is substitution operator that assigns the right side to the left side.

Figure 14:
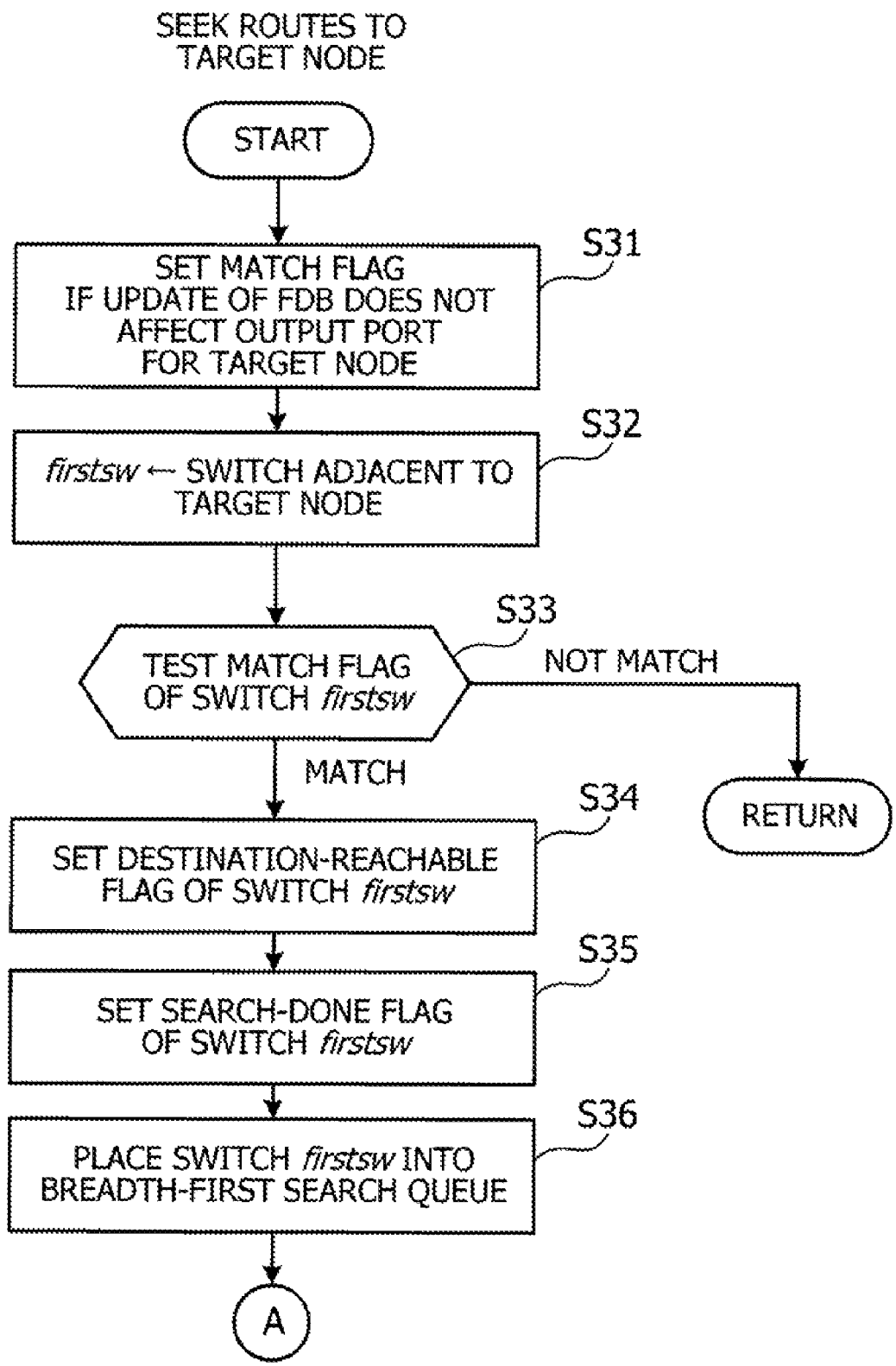
FIGS. 14 and 15 are two halves of a flowchart illustrating how to find routes reaching a specific target node.

(Step S22) The FDB distribution sequencing unit 150 seeks routes that can reach the target node, the details of which will be described later with reference to FIGS. 14 and 15. For example, this operation is executed as an instruction of "reachroute=reachable(initroute, targetroute)" in a computer program. Here, "reachable( )" is a function that seeks a destination-reachable range, and "targetroute" is a variable representing updated routing data. That is, the FDB distribution sequencing unit 150 executes a function "reachable( )" with arguments "initroute" and "targetroute" representing initial routes and updated routes, respectively, and it assigns the return value of the function to variable "reachroute" representing the routes reaching the target node.

Figure 17:
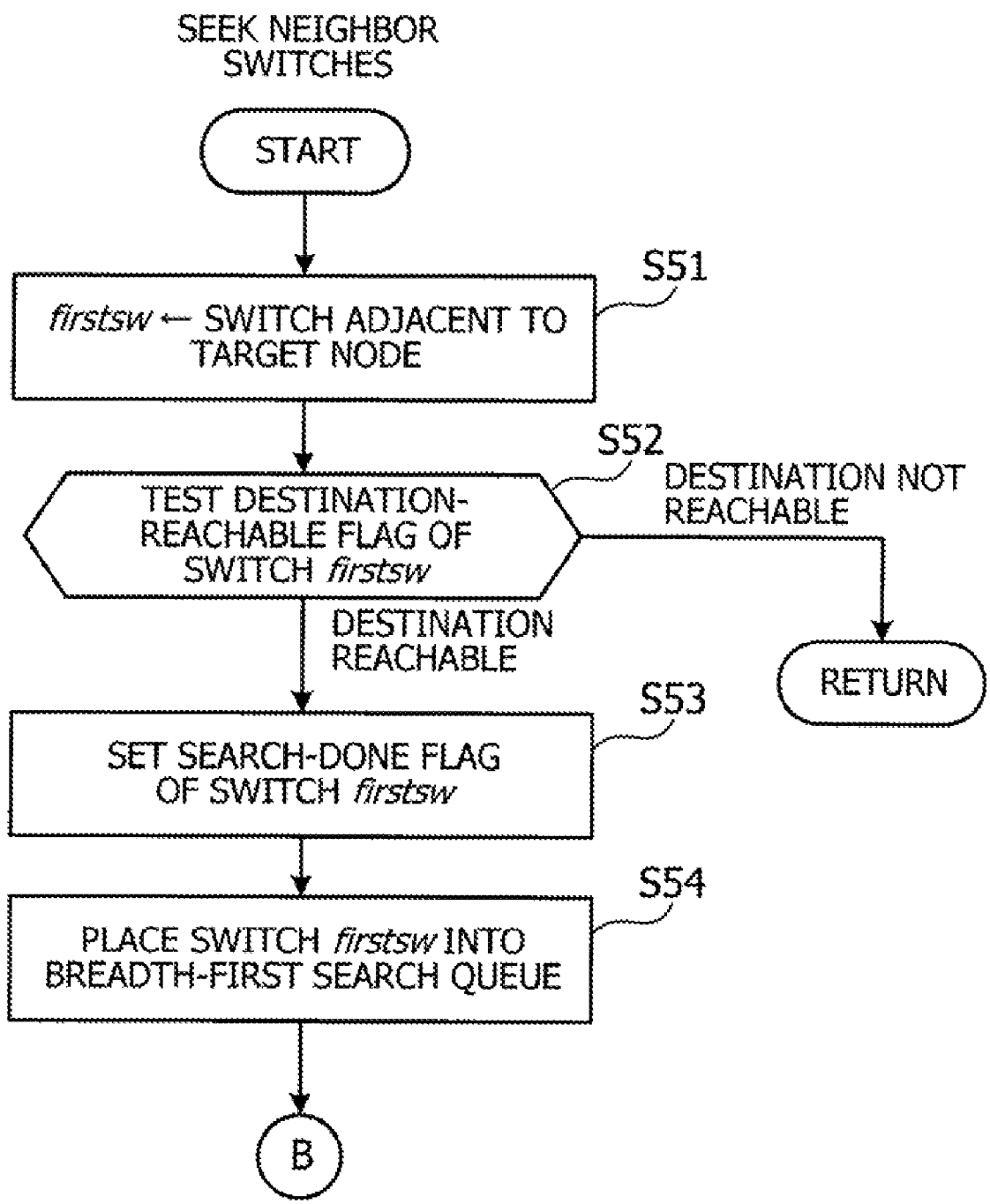
FIGS. 17 and 18 are two halves of a flowchart illustrating how to find neighbor switches.

(Step S23) The FDB distribution sequencing unit 150 seeks neighbor switches adjacent to the destination-reachable routes, the details of which will be described later with reference to FIGS. 17 and 18. For example, this operation is executed as an instruction of "neighbors=searchneighbor (reachroute, targetroute)" in a computer program, where "searchneighbor( )" is a function that seeks neighbor switches. That is, the FDB distribution sequencing unit 150 executes a function "searchneighbor( )" with arguments "reachroute" and "targetroute" representing destination-reachable routes and updated routes, respectively. The return value of the function is then assigned to variable "neighbors" representing a list of neighbor switches.

(Step S24) The FDB distribution processing unit 160 issues an FDB update command to the found neighbor switches. More specifically, the FDB distribution processing unit 160 interacts with the route generating unit 140 to obtain updated routing data for the target node. The FDB distribution processing unit 160 then examines the updated routing data to figure out to which switch the neighbor switches forward their packets. The FDB distribution processing unit 160 now retrieves switch management records of the neighbor switches from the link connection data memory 110, thus determining which output port to use to send packets to the target node, assuming that the packets are forwarded according to the updated routing data. The FDB distribution processing unit 160 then turns to the FDB memory 120 to retrieve FDB of each neighbor switch and updates its output port field corresponding to the target node's DLID, based on the result of the above determination of new output ports. Now that an updated version of FDBs is at hand, the FDB distribution processing unit 160 produces control packets containing those updated FDB records and transmits them to the neighbor switches. Those control packets contain an instruction that requests the receiving switch to update its local FDB.

Each receiving switch updates its FDB in local memory according to the FDB update command and FDB records in the received control packet. Upon completion of update, the switches return a response to the network management apparatus 100 to indicate the completion. This response permits the FDB distribution processing unit 160 to update the FDBs of neighbor switches which are stored in the FDB memory 120, as well as the current routing data "curroute" based thereon. The FDB distribution processing unit 160 then notifies the FDB distribution sequencing unit 150 of the completion of update.

(Step S25) The FDB distribution sequencing unit 150 adds the neighbor switches to the current set of destination-reachable routes. The details will be described later with reference to FIG. 20. For example, this operation is executed as an instruction of "neighbors="addreachable(reachroute, neighbors)" in a computer program, where "addreachable( )" is a function that adds neighbor switches to the destination-reachable route data. That is, the FDB distribution sequencing unit 150 executes a function "addreachable( )" with arguments "reachroute" and "neighbors" representing destination-reachable routes and neighbor switches, respectively. As result of this operation, the destination-reachable routing data "reachroute" now contains additional routes originating at the neighbor switches. More details will be discussed later.

(Step S26) The FDB distribution sequencing unit 150 determines whether all switches in the network have been incorporated into the destination-reachable switches. More specifically, the FDB distribution sequencing unit 150 so determines when the current routing data matches with the updated routing data. For example, this operation is executed as an instruction of "neighbors=isallreachable(curroute, targetroute)" in a computer program, where "isallreachable( )" is a function that tests the agreement between two sets of routing data given as arguments of the function. That is, the FDB distribution sequencing unit 150 executes a function "isallreachable( )" with arguments "curroute" and "targetroute" representing the current routes and updated routes, respectively. When it is confirmed that every switch can reach the target node, then the process terminates itself. When there is a switch that cannot reach the target node, the process returns to step S23.

The above-described process makes it possible to issue FDB update commands to the switches adjacent to the current set of destination-reachable routes in an incremental fashion. When a group of such neighbor switches finishes updating their local FDB, that group is incorporated into the current set of destination-reachable routes. Another search for neighbor switches is then performed based on the new data. In this way, every relevant switch in the network will have finally received an FDB update command from the network management apparatus 100.

The details of creation of routing data for a specified target node will now be described below. FIG. 14 is a first half of a flowchart illustrating how to seek routes to a specified target node. The processing steps constituting this process will be described below in the order of step numbers.

(Step S31) The FDB distribution sequencing unit 150 compares output port field values between the original FDB and updated FDB of each switch. This comparison is performed with respect to LID of the target node, which is found in the DLID field of each switch's FDB. The FDB distribution sequencing unit 150 produces a route determination table (described later in FIG. 16) made up of a plurality of table entries corresponding to switch IDs. When the above comparison indicates that the update of FDBs does not affect output ports of a switch, the FDB distribution sequencing unit 150 sets a match flag in the table entry corresponding to that switch.

(Step S32) The FDB distribution sequencing unit 150 retrieves information about a switch that is located adjacent to the target node. For example, the FDB distribution sequencing unit 150 consults the link connection data 111 to seek a switch having a port whose linked-to field contains LID of the target node. The FDB distribution sequencing unit 150 identifies the found switch as being adjacent to the target node and thus assigns its switch ID to variable "firstsw."

(Step S33) The FDB distribution sequencing unit 150 now turns to the route determination table to find a table entry corresponding to the switch represented by variable "firstsw" (hereafter, switch "firstsw"). If the match flag of that table entry is set (i.e., match), the process advances to step S34. If the match flag is not set (i.e., not match), the FDB distribution sequencing unit 150 exits from the present process since it indicates the absence of routes reaching the target node.

(Step S34) The FDB distribution sequencing unit 150 sets a destination-reachable flag corresponding to switch "firstsw" in the route determination table.

(Step S35) The FDB distribution sequencing unit 150 also sets a search-done flag corresponding to switch "firstsw" in the route determination table.

(Step S36) The FDB distribution sequencing unit 150 places the information (switch ID) of switch "firstsw" into a breadth-first search queue. The process then advances to step S41 in FIG. 15.

Figure 15:
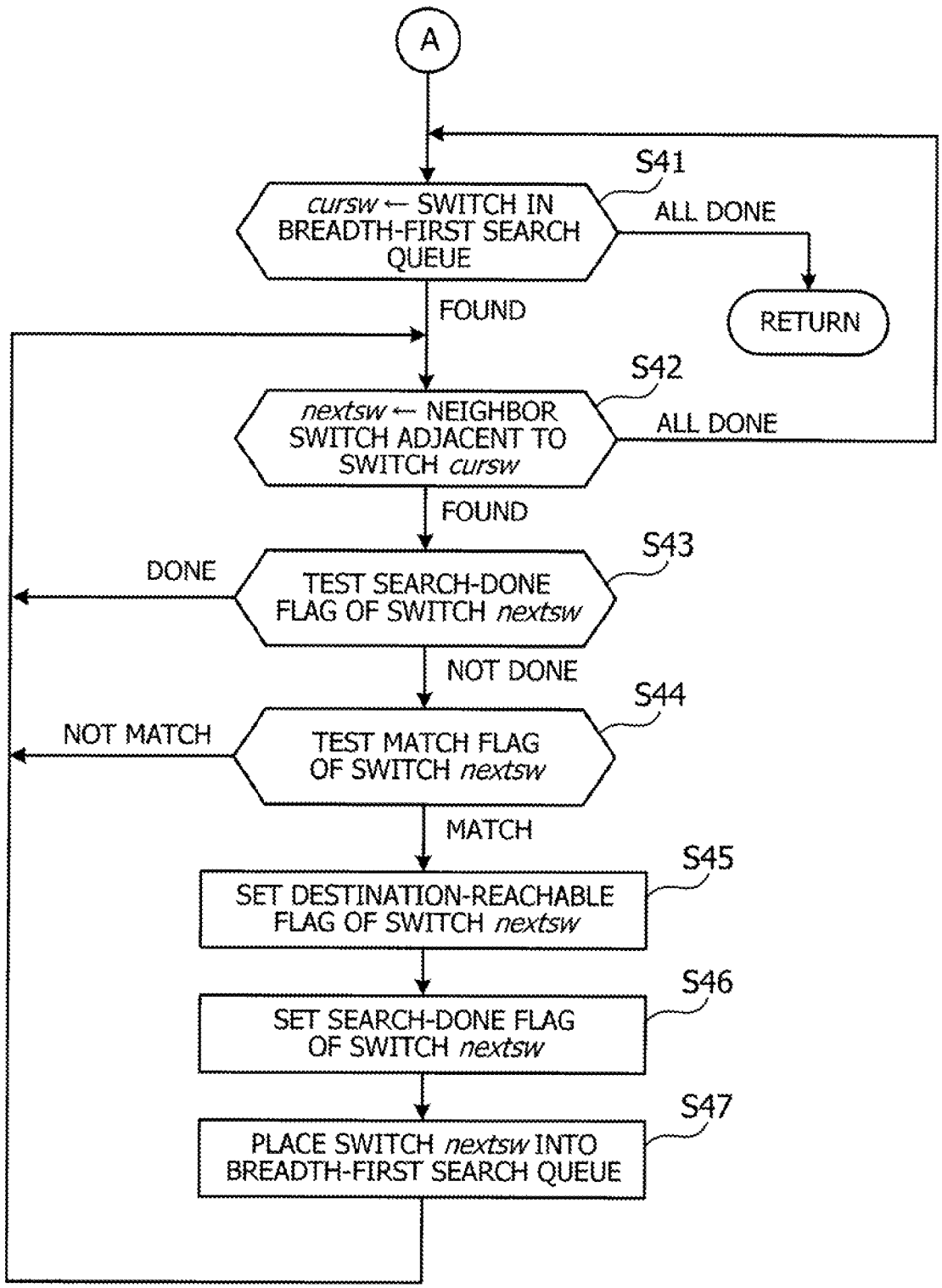

FIG. 15 is a second half of the flowchart, the steps of which will be described below in the order of step numbers.

(Step S41) The FDB distribution sequencing unit 150 reads an entry of switch information out of the breadth-first search queue and assigns that switch information to variable "cursw." When the breadth-first search queue has such a pending entry, the process advances to step S42. When the breadth-first search queue is empty (i.e., no queue entries to read), the FDB distribution sequencing unit 150 exits from the present process.

(Step S42) The FDB distribution sequencing unit 150 obtains the switch ID of a neighbor switch that is adjacent to the switch represented by variable "cursw" (hereafter, switch "cursw"). For example, the FDB distribution sequencing unit 150 searches the link connection data 111 to find switches linked to the switch "cursw." While there may be two or more such switches, the FDB distribution sequencing unit 150 selects one switch that has not undergone the processing and assigns its ID to variable "nextsw." When such an unprocessed switch ID is found, then the process advances to step S43. When no such ID can be obtained (i.e., every neighbor switch has been done), the process returns to step S41.

(Step S43) The FDB distribution sequencing unit 150 consults the route determination table to test the search-done flag of switch "nextsw." If the search-done flag is set, the process returns to step S42. If the search-done flag is not set, the process proceeds to step S44.

(Step S44) The FDB distribution sequencing unit 150 consults again the route determination table to test the match flag of switch "nextsw." If the match flag is set, the process advances to step S45. If the match flag is not set, the process returns to step S42.

(Step S45) The FDB distribution sequencing unit 150 sets a destination-reachable flag corresponding to switch "nextsw" in the route determination table.

(Step S46) The FDB distribution sequencing unit 150 also sets a search-done flag corresponding to switch "nextsw" in the route determination table.

(Step S47) The FDB distribution sequencing unit 150 places the information (switch ID) of switch "nextsw" into the breadth-first search queue. The process then goes back to step S42 to process another neighbor switch.

Through the above processing steps, the FDB distribution sequencing unit 150 produces an initial version of routing data indicating which routes can reach the target node at present. Specifically, the route determination table is populated with the flags indicating the presence of destination-reachable routes.

FIG. 16 illustrates an example data structure of the aforementioned route determination table. The illustrated route determination table 151 has been produced by the FDB distribution sequencing unit 150 and saved in a storage space of RAM 102. Note that the route determination table 151 is associated with a specific target node and thus contains LID of that node (e.g., the node with an LID of 0x1).

Specifically, the route determination table 151 is formed from the following data fields: "Switch ID," "Match Flag," "Destination-Reachable Flag," and "Search-Done Flag." The switch ID field enumerates IDs of switches 21 to 32 in the network. The match flag field indicates the comparison result of output ports in the original and updated FDBs concerning the target node of interest. In the example of FIG. 16, the match flag field contains zeros as its initial values, meaning that the match flag of each corresponding switch is "not set." The match flag field of some switches may be changed later from zero to one, which means that the match flag is "set."

The destination-reachable flag field indicates whether packets sent from the corresponding switch can reach the target node. In the example of FIG. 16, the destination-reachable flag field contains zeros as its initial values, meaning that the destination-reachable flag of each corresponding switch is "not set." The destination-reachable flag field of some switches may be changed later from zero to one, which means that the destination-reachable flag is "set."

The search-done flag field indicates whether a search concerning the corresponding switch is finished when any such search is involved. In the example of FIG. 16, the search-done flag field contains zeros as its initial values, meaning that the search-done flag of each corresponding switch is "not set." The search-done flag field of some switches may be changed later from zero to one, which means that the search-done flag is "set."

The route determination table 151 seen in FIG. 16 represents a state after the FDB distribution sequencing unit 150 has finished a process of seeking destination-reachable routes in the course of migration from the original routing data 71 (FIG. 9) to new routing data 71a (FIG. 12). Specifically, the route determination table 151 of FIG. 16 indicates that the switches 21 to 25 identified by their IDs, A to E, can reach the target node without the need for updating their FDBs.

After the initial set of destination-reachable routes is produced, the FDB distribution sequencing unit 150 seeks neighbor switches adjacent to the current destination-reachable routes. FIG. 17 is a first half of a flowchart illustrating this search operation, the detailed processing steps of which will be described below in the order of step numbers. It is noted here that the search-done flag field of the route determination table 151 is reset to zeros before starting a process of seeking neighbor switches.

(Step S51) The FDB distribution sequencing unit 150 retrieves information about a switch adjacent to the target node and assigns the ID of that switch to variable "firstsw."

(Step S52) The FDB distribution sequencing unit 150 consults the route determination table 151 to find a table entry corresponding to the switch represented by variable "firstsw" (hereafter, switch "firstsw"). If the destination-reachable flag of that table entry is set, the process advances to step S53. If the destination-reachable flag is not set, the FDB distribution sequencing unit 150 exits from the present process since it indicates the absence of routes reaching the target node.

(Step S53) The FDB distribution sequencing unit 150 sets a search-done flag corresponding to the switch "firstsw" in the route determination table 151.

(Step S54) The FDB distribution sequencing unit 150 places the information (switch ID) of switch "firstsw" into a breadth-first search queue. The process then advances to step S61 (FIG. 18).

Figure 18:
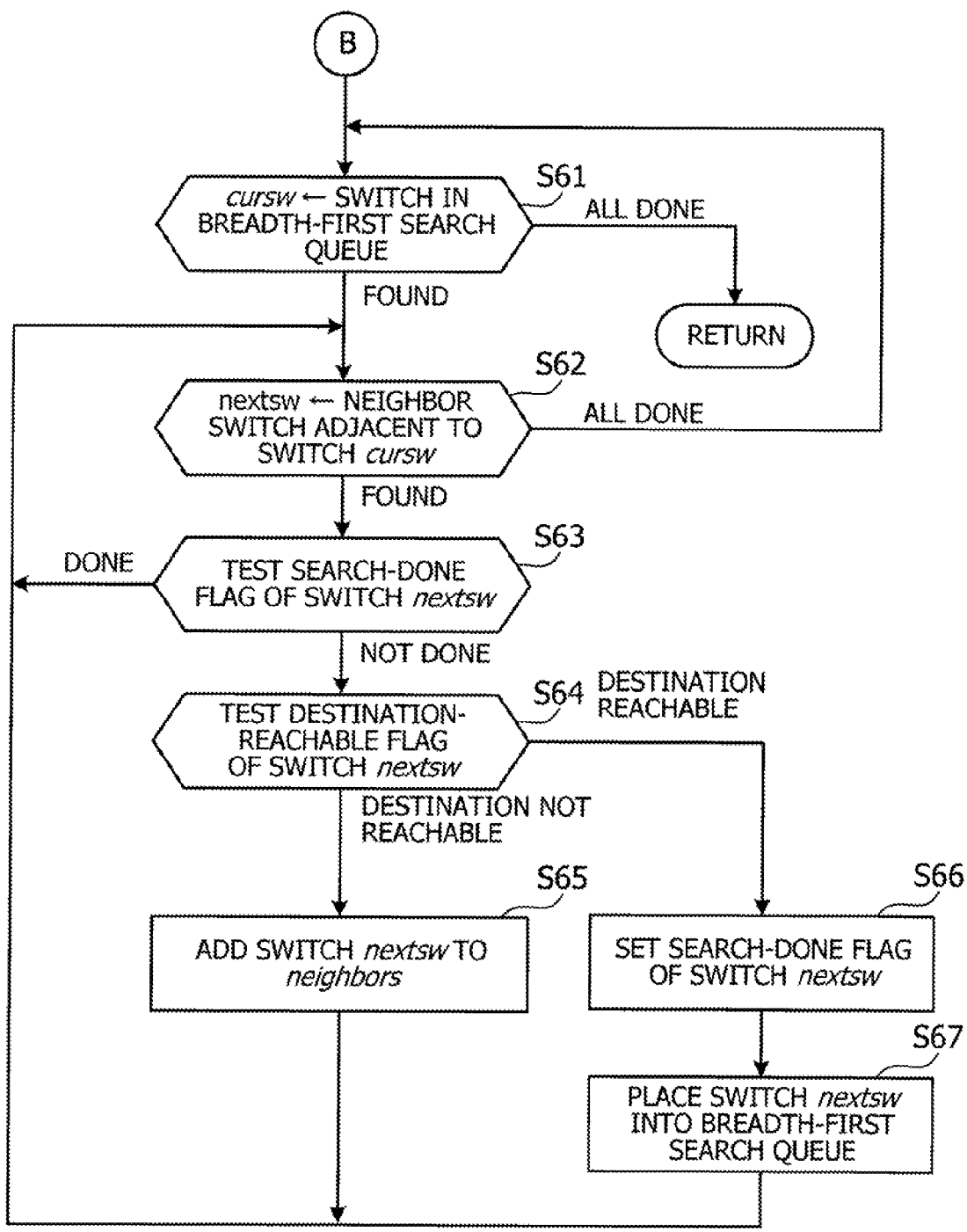

FIG. 18 is a second half of the same flowchart, the steps of which will be described below in the order of step numbers.

(Step S61) The FDB distribution sequencing unit 150 reads an entry of switch information out of the breadth-first search queue and assigns that switch information to variable "cursw." When the breadth-first search queue offers such a pending entry, the process advances to step S62. If the breadth-first search queue is empty (i.e., no queue entries to read), the FDB distribution sequencing unit 150 exits from the present process.

(Step S62) The FDB distribution sequencing unit 150 seeks a neighbor switch that is adjacent to the switch represented by variable "cursw" (hereafter, switch "cursw"). This neighbor switch is supposed to be connected directly to switch "cursw," and one of its output ports points to switch "cursw" in the corresponding updated FDB. While there may be two or more such switches, the FDB distribution sequencing unit 150 selects one switch that has not undergone the processing and assigns its ID to variable "nextsw." When such an unprocessed switch ID is found, then the process advances to step S63. When no pending IDs are present (i.e., every neighbor switch has been done), the process returns to step S61.

(Step S63) The FDB distribution sequencing unit 150 consults the route determination table 151 to test the search-done flag of a switch represented by variable "nextsw" (hereafter, switch "nextsw"). If the search-done flag is set, the process returns to step S62. If the search-done flag is not set, the process proceeds to step S64.

(Step S64) The FDB distribution sequencing unit 150 consults the route determination table 151 to test the destination-reachable flag of switch "nextsw." If the destination-reachable flag is set (i.e., the destination can be reached), the process advances to step S66. If the destination-reachable flag is not set (i.e., the destination cannot be reached), the process advances to step S65.

(Step S65) The FDB distribution sequencing unit 150 adds the ID of switch "nextsw" to a neighbor switch list "neighbors" and then returns to step S62.

(Step S66) The FDB distribution sequencing unit 150 sets search-done flag of switch "nextsw" in the route determination table 151.

(Step S67) The FDB distribution sequencing unit 150 places the information (switch ID) of switch "nextsw" into the breadth-first search queue and then returns to step S62.

Figure 19:
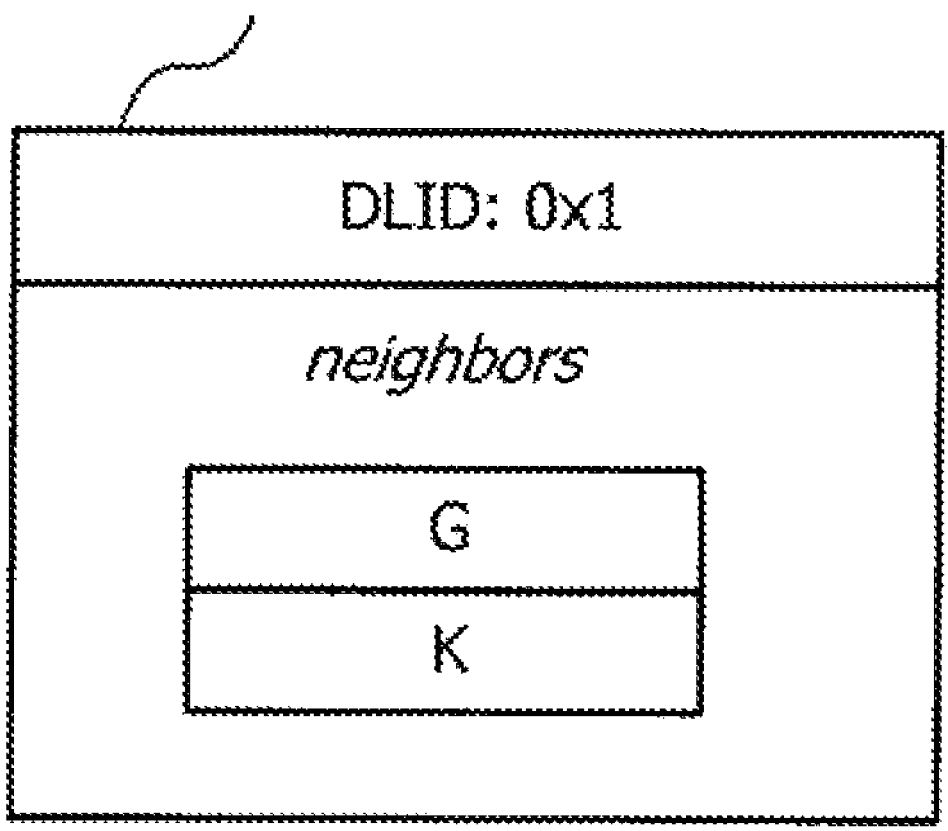
FIG. 19 illustrates an example data structure of a neighbor switch list.

The above processing steps yield a neighbor switch list enumerating IDs of neighbor switches found to be adjacent to the current destination-reachable routes. FIG. 19 illustrates an example data structure of a neighbor switch list. The illustrated neighbor switch list 152 has been produced by the FDB distribution sequencing unit 150 and saved in a storage space of RAM 102. This neighbor switch list 152 is associated with a specific destination of packets and thus contains DLID of that destination. The neighbor switch list 152 contains switch IDs that represent switches located outside of, but adjacent to, the current destination-reachable routes.

Upon receipt of such a neighbor switch list 152 from the FDB distribution sequencing unit 150, the FDB distribution processing unit 160 distributes updated FDBs for the target node to the neighbor switches named in the neighbor switch list 152. The current set of destination-reachable routes is then updated by the FDB distribution sequencing unit 150, so as to include the above neighbor switches in the following way.

Figure 20:
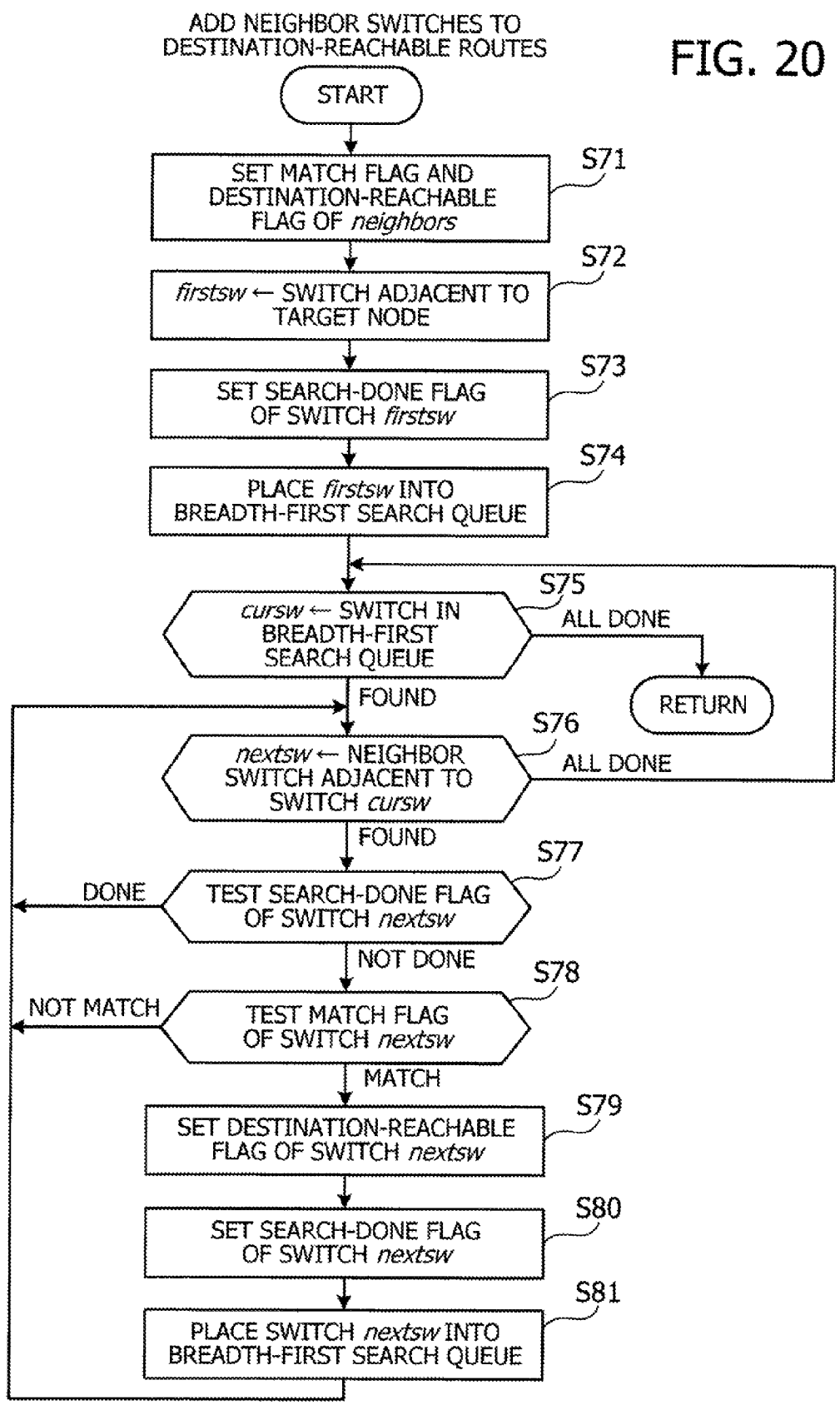
FIG. 20 is a flowchart of a process to add neighbor switches to destination-reachable routes.

FIG. 20 is a flowchart illustrating a process of adding neighbor switches to the current destination-reachable routes, the steps of which will be described below in the order of step numbers. It is noted that the search-done flag field of the route determination table 151 is reset to zeros before starting the process of adding neighbor switches.

(Step S71) The FDB distribution sequencing unit 150 sets the match flag and destination-reachable flag of switches named in the neighbor switch list 152 derived from the route determination table 151.

(Step S72) The FDB distribution sequencing unit 150 retrieves information about a switch adjacent to the target node and assigns the ID of that switch to variable "firstsw."

(Step S73) The FDB distribution sequencing unit 150 sets a search-done flag corresponding to the switch represented by variable "firstsw" (hereafter, switch "firstsw") in the route determination table 151.

(Step S74) The FDB distribution sequencing unit 150 places the information (switch ID) of switch "firstsw" into a breadth-first search queue.

(Step S75) The FDB distribution sequencing unit 150 reads an entry of switch information out of the breadth-first search queue and assigns that switch information to variable "cursw." When the breadth-first search queue offers such a pending entry, the process advances to step S76. When the breadth-first search queue is empty (i.e., no queue entries to read), the FDB distribution sequencing unit 150 exits from the present process.

(Step S76) The FDB distribution sequencing unit 150 seeks a neighbor switch that is adjacent to the switch represented by variable "cursw" (hereafter, switch "cursw"). This neighbor switch is supposed to be connected directly to switch "cursw," and one of its output ports points to switch "cursw" in the corresponding updated FDB. While there may be two or more such switches, the FDB distribution sequencing unit 150 selects one switch that has not undergone the processing and assigns its ID to variable "nextsw." When such an unprocessed switch ID is found, then the process advances to step S77. When there are no pending IDs (i.e., every neighbor switch has been done), the process returns to step S75.

(Step S77) The FDB distribution sequencing unit 150 consults the route determination table 151 to test the search-done flag of a switch represented by variable "nextsw" (hereafter, switch "nextsw"). If the search-done flag is set, the process returns to step S76. If the search-done flag is not set, the process proceeds to step S78.

(Step S78) The FDB distribution sequencing unit 150 consults the route determination table 151 to test the match flag of switch "nextsw." If the match flag is set, the process advances to step S79. If the search-done flag is not set, the process returns to step S76.

(Step S79) The FDB distribution sequencing unit 150 sets the destination-reachable flag of switch "nextsw" in the route determination table 151.

(Step S80) The FDB distribution sequencing unit 150 sets the search-done flag of switch "nextsw" in the route determination table 151.

(Step S81) The FDB distribution sequencing unit 150 places the information (switch ID) of switch "nextsw" into the breadth-first search queue and then returns to step S76.

The above processing steps update the route determination table 151, and during that course, the destination-reachable routes gain new switches, whose FDB have been updated. FIG. 21 illustrates an example of a new state of the route determination table 151, which contains information on such newly added switches. Compared with its former state discussed in FIG. 16, the route determination table 151 of FIG. 21 now provides some new information. For example, the match flag, destination-reachable flag, and search-done flag are set for switch G 27 and switch K 31, which are named in the neighbor switch list 152 of FIG. 19. The same applies to the flags of another switch I 29. This switch I 29 is configured to forward packets to switch G 27 and has thus been added to the destination-reachable routes together with the switch G 27.

As can be seen from the above, the destination-reachable range of the network has been expanded by the addition of switches that have received an updated FDB. The expanded destination-reachable range is then subjected to another cycle of seeking neighbor switches adjacent thereto, which results in discovery of more switches that can reach the destination. By repeating these operations, all switches on the network will finally receive their updated FDBs. The next section will present an example of how neighbor switches are merged into the expanding destination-reachable routes in each cycle of FDB distribution. This FDB distribution cycle refers to the loop of steps S23 to S25 in the flowchart of FIG. 13.

Figure 22:
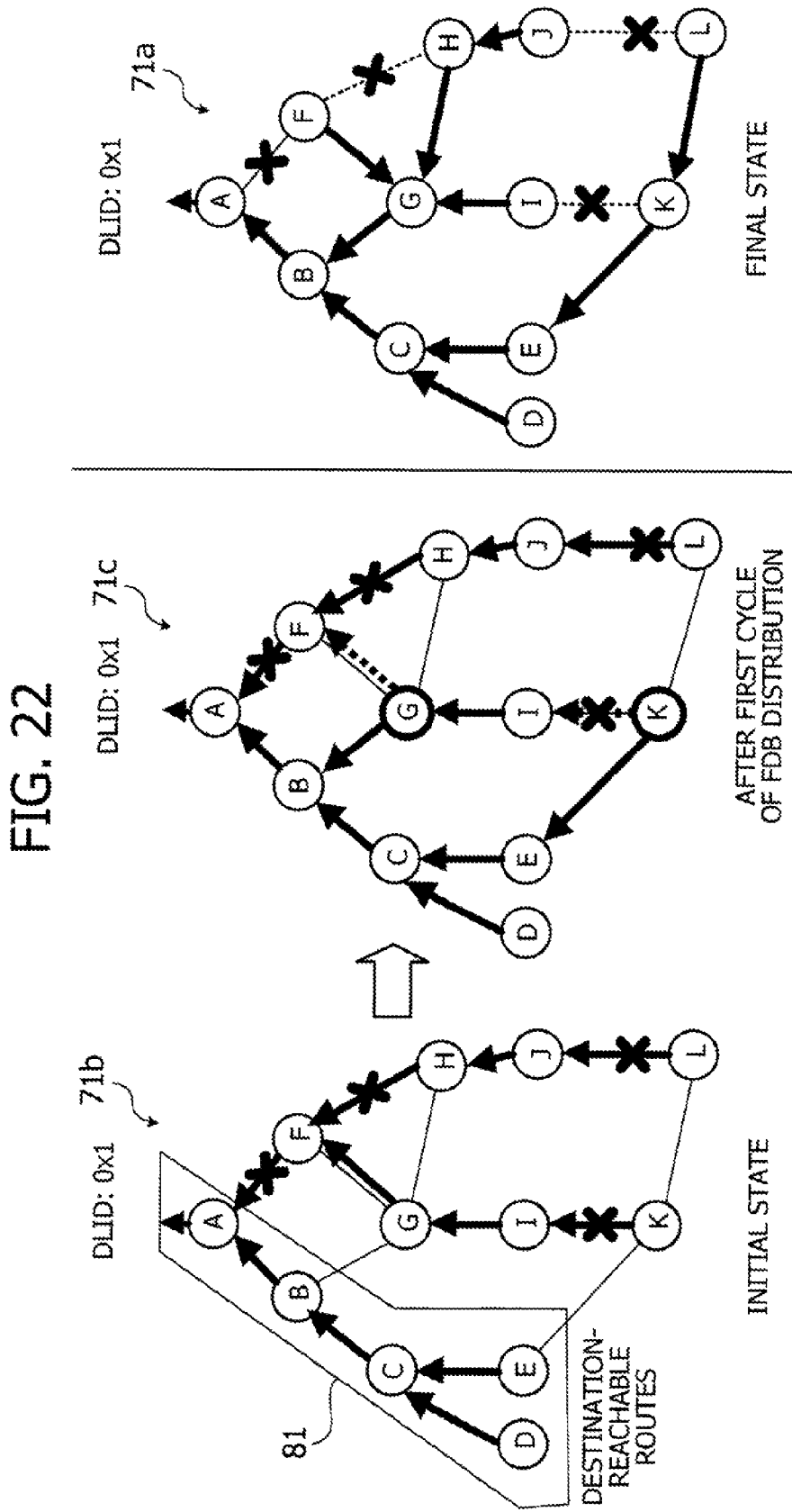
FIG. 22 illustrates destination-reachable routes and neighbor switches before and after a first cycle of FDB distribution.

FIG. 22 illustrates destination-reachable routes and their neighbor switches before and after the first cycle of FDB distribution. Specifically, FIG. 22 depicts three sets of routing data 71a to 71c which reflect the updates made to FDBs for packets with a DLID of 0x1. The alphabets in a circle represent switches, and the arrows indicate the direction of packets transmitted from each switch. The crosses on a route indicate where the communication is disrupted due to failures.

Seen in the rightmost portion of FIG. 22 is routing data 71a in the final state. Seen in the leftmost portion of FIG. 22 is routing data 71b in the initial state. The FDB of each switch will be updated in accordance with stepwise migration of the initial routing data 71b into the final routing data 71a.

To achieve the above migration, the initial routing data 71b is searched to find destination-reachable routes 81 for packets addressed the node specified by DLID=0x1. In the example of FIG. 22, the destination-reachable routes 81 include five switches A, B, C, D, and E. Another search is then performed to find neighbor switches adjacent to those destination-reachable routes 81. In the example of FIG. 22, two switches G and K are discovered as neighbor switches. Accordingly, updated FDBs for DLID 0x1 are distributed first to these two switches G and K so as to change their packet forwarding directions. For example, switch G receives an updated FDB that specifies an output port linked to switch B. Similarly, the switch K receives an updated FDB that specifies an output linked to switch E. As a result of this first cycle of FDB distribution, the destination node specified by DLID 0x1 becomes reachable from the two switches G and K because of the received new FDBs.

Figure 23:
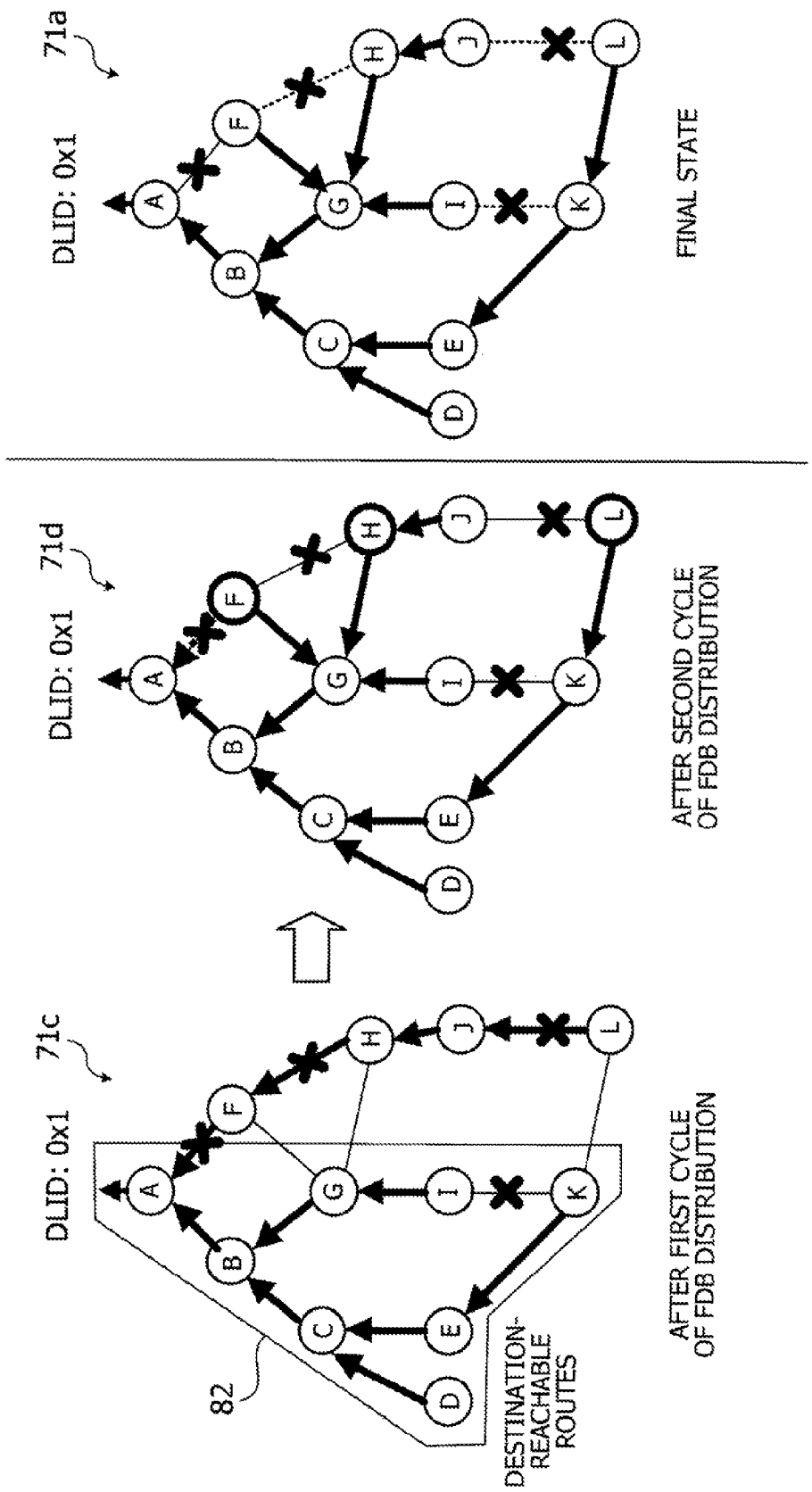
FIG. 23 illustrates destination-reachable routes and neighbor switches before and after a second cycle of FDB distribution.

FIG. 23 illustrates destination-reachable routes and neighbor switches before and after a second cycle of FDB distribution. In this second cycle of FDB distribution, the routing data 71c obtained in the first cycle is searched, assuming that destination-reachable routes 82 are now available for delivering packets to the node specified by DLID=0x1. In the example of FIG. 23, the destination-reachable routes 82 include eight switches A, B, C, D, E, G, I, and K. A search is then performed to find neighbor switches adjacent to those destination-reachable routes 82. In the example of FIG. 23, three more switches F, H, and L are discovered as neighbor switches. Accordingly, updated FDBs for DLID 0x1 are distributed to these three switches F, H, and L so as to change their packet forwarding directions. For example, switch F receives an updated FDB that specifies an output port linked to switch G. Switch H receives an updated FDB that specifies an output port linked to switch G. Switch L receives an updated FDB that specifies an output port linked to switch K.

The second cycle of FDB distribution yields routing data 71d, which includes more switches with updated FDBs enabling them to reach the destination node specified by DLID=0x1. As a result, every switch in the network can now reach the destination node.

As can be seen from the above, the FDB update process of the second embodiment produces no switching loops since it is designed to start updating FDBs from the switches located nearest to the existing destination-reachable routes. For this reason, the second embodiment makes it possible to reroute packets in response to a route-changing event, without spoiling the reliability of communication.

More specifically, according to the second embodiment, the FDB update process compares initial routes (initroute) with updated routes (targetroute) to extract a common portion of those routes. For a node specified by a destination address, the process identifies a range of the network that can reach the destination node by only using the extracted common portion of the routes. Then, out of the switches that cannot reach the destination node at present, a neighbor switch (neighbors) adjacent to the identified destination-reachable range is updated. In the case where two such neighbor switches are found, either can be updated first. The update of FDBs results in an additional destination-reachable range, which is thus incorporated into the existing range. The above operations are repeated until all switches become able to reach the destination node.

The above-described FDB update process avoids switching loops for the following reasons. It is noted first that, to produce a loop as a result of FDB update of a destination-unreachable switch, the destination-reachable range has to include a switch that has an output port directed to the destination-unreachable range. However, the switches included in the destination-reachable range actually form a tree-structure network, in which all constituent switches are directed to a single destination address. This means that there are no paths to send packets into the destination-unreachable range, and accordingly, no loops can be produced. It is also ensured that the current routes constituting a destination-reachable range will never be disconnected because the switches in the destination-reachable range are not subject to manipulation. Accordingly, the proposed FDB update process is loop-free.

Third Embodiment

This section describes a third embodiment designed to enhance the performance of FDB distribution. FDBs are updated on an individual DLID basis, i.e., for each destination node address of packets. Accordingly, the number of updates may amount to, at maximum, the number of switches multiplied by the number of destination addresses. For example, in the case where the network has 10 switches to serve 64 destinations, the network management apparatus has to execute 640 updates.

FDBs may have a structure that permits its output port parameters to be updated for a plurality of destination addresses in a collective manner. For example, the FDBs of InfiniBand™ are formed from a plurality of tables each accommodating 64 destination addresses, which allows update of those 64 addresses with a single action. The third embodiment introduces a collective update mechanism into its FDB updating process so as to enhance the performance.

Figure 24:
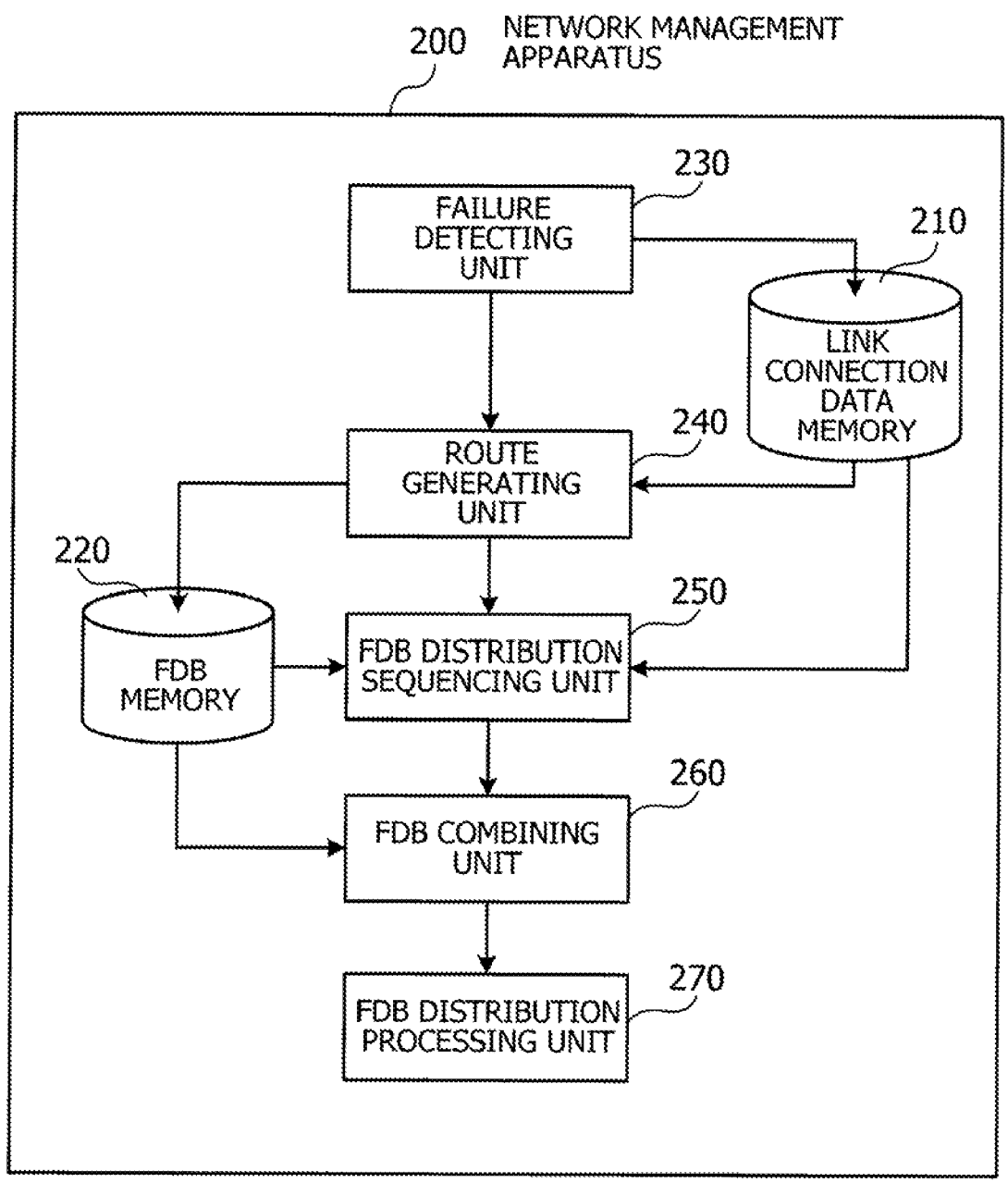
FIG. 24 is a functional block diagram of a network management apparatus according to a third embodiment.

FIG. 24 is a functional block diagram of a network management apparatus according to the third embodiment. This network management apparatus 200 includes a link connection data memory 210, an FDB memory 220, a failure detecting unit 230, a route generating unit 240, an FDB distribution sequencing unit 250, an FDB combining unit 260, and an FDB distribution processing unit 270. The link connection data memory 210, FDB memory 220, failure detecting unit 230, route generating unit 240, and FDB distribution processing unit 270 are similar to their counterparts in the foregoing second embodiment. Accordingly, the description of these components will not be repeated here.

The FDB distribution sequencing unit 250 produces a series of partial order numbers to specify, for each DLID, the order of switches to be updated. Partial order numbers indicate in what order the FDBs of switches should be updated. Those FDBs may be assigned the same partial order number when there is no preference in their order. The FDB combining unit 260 combines updates of FDB for a particular switch when their DLIDs have the same partial order number, thus producing a unified FDB.

Figure 25:
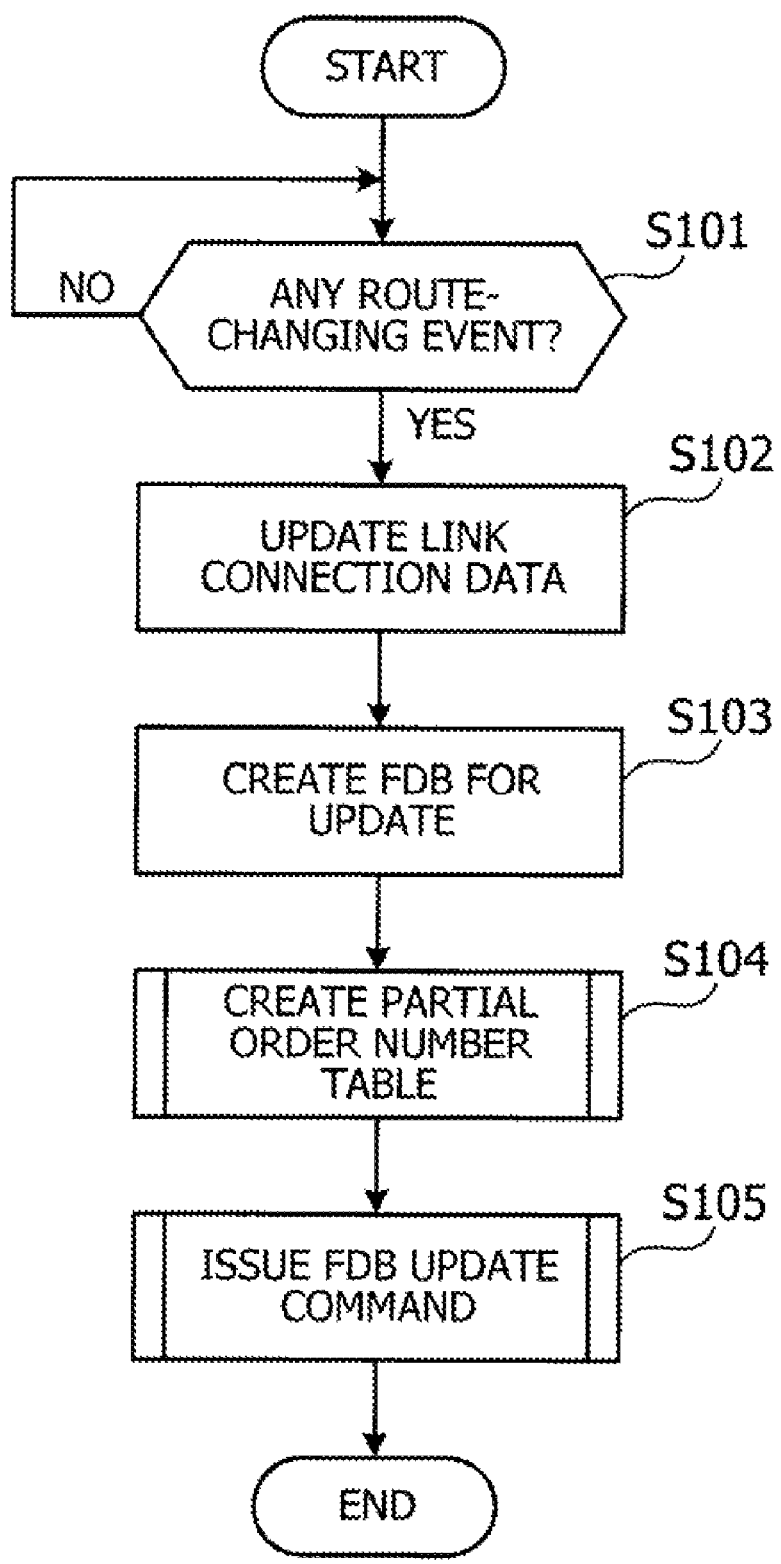
FIG. 25 is a flowchart illustrating a process of updating routes according to the third embodiment.

FIG. 25 is a flowchart illustrating a process of updating routes according to the third embodiment. The steps of this process will be described below in the order of step numbers.

(Step S101) The failure detecting unit 230 determines whether there is any event that causes a route change. For details of this step, see the description of step S11 in FIG. 10. When a route-changing event is detected, the process proceeds to step S102. Otherwise, step S101 is repeated.

(Step S102) The failure detecting unit 230 updates link connection data. Details of this step are similar to step S12 in FIG. 10.

(Step S103) Based on the updated link connection data, the route generating unit 240 determines a new forwarding route for each destination node of packets and thus produces a new set of FDBs for update in the respective switches 21 to 32. Details of this step are similar to step S13 in FIG. 10.

(Step S104) The FDB distribution sequencing unit 250 produces a partial order number table. Details of this step S104 will be described later with reference to FIG. 26.

(Step S105) The FDB combining unit 260 and FDB distribution processing unit 270 work together to command each switch 21 to 32 to update their FDBs. Details of this step S105 will be described later with reference to FIG. 28.

Referring now to the flowchart of FIG. 26, the aforementioned process of producing a partial order number table will be described below in the order of step numbers.

(Step S111) The FDB distribution sequencing unit 250 assigns initial routing data for the specified target node as current routing data. This operation is executed as an instruction of, for example, "curroute=initroute" in a computer program. Details of this step S111 are similar to step S21 in FIG. 13.

(Step S112) The FDB distribution sequencing unit 250 seeks routes that can reach the target node, the details of which will be described later. For example, this operation is executed as an instruction of "reachroute=reachable(initroute, targetroute)" in a computer program. This instruction is similar to the one discussed in step S22 of FIG. 13.

(Step S113) The FDB distribution sequencing unit 250 initializes a partial order number for subsequent use. For example, this operation is executed as an instruction of "order=1" in a computer program, which means that a value of one is assigned to a variable named "order."

(Step S114) The FDB distribution sequencing unit 250 seeks neighbor switches adjacent to the destination-reachable routes. For example, this operation is executed as an instruction of "neighbors=searchneighbor(reachroute, targetroute)" in a computer program. Details of this operation are similar to what have been discussed in FIGS. 17 and 18.

(Step S115) The FDB distribution sequencing unit 250 populates a partial order number table with partial order numbers of the found neighbor switches. More specifically, the FDB distribution sequencing unit 250 maintains a partial order number for subsequent use and assigns it to the neighbor switches detected at step S113 when saving them in the partial order number table. For example, this operation is executed as an instruction of "savetotable(order, neighbors)" in a computer program, where "savetotable( )" is a function that records given data in the partial order number table. The FDB distribution sequencing unit 250 executes this function "savetotable( )" with arguments of "order" specifying a partial order number and "neighbors" specifying a listing of neighbor switches. As a result, the partial order number table is populated with the specified partial order number in the columns corresponding to the specified neighbor switches.

(Step S116) The FDB distribution sequencing unit 250 increments the partial order number. For example, this operation is executed as an instruction of "order++" in a computer program, which increments variable "order" by one.

(Step S117) The FDB distribution sequencing unit 250 adds the neighbor switches to the current set of destination-reachable routes. Details of this step S117 are similar to what have been discussed in FIG. 20.

(Step S118) The FDB distribution sequencing unit 250 determines whether every switch in the network can reach the target node. More specifically, the FDB distribution sequencing unit 250 so determines when all switches in the network have been incorporated into the destination-reachable routes. This operation is executed as an instruction of "isallreachable2(reachroute)" in a computer program, where "isallreachable2( )" is a function that tests whether all switches are included in destination-reachable routes specified by its argument "reachroute." If it is found that every switch can reach the target node, then the process terminates itself. If there is a switch that cannot reach the target node, the process returns to step S114.

Figure 26:
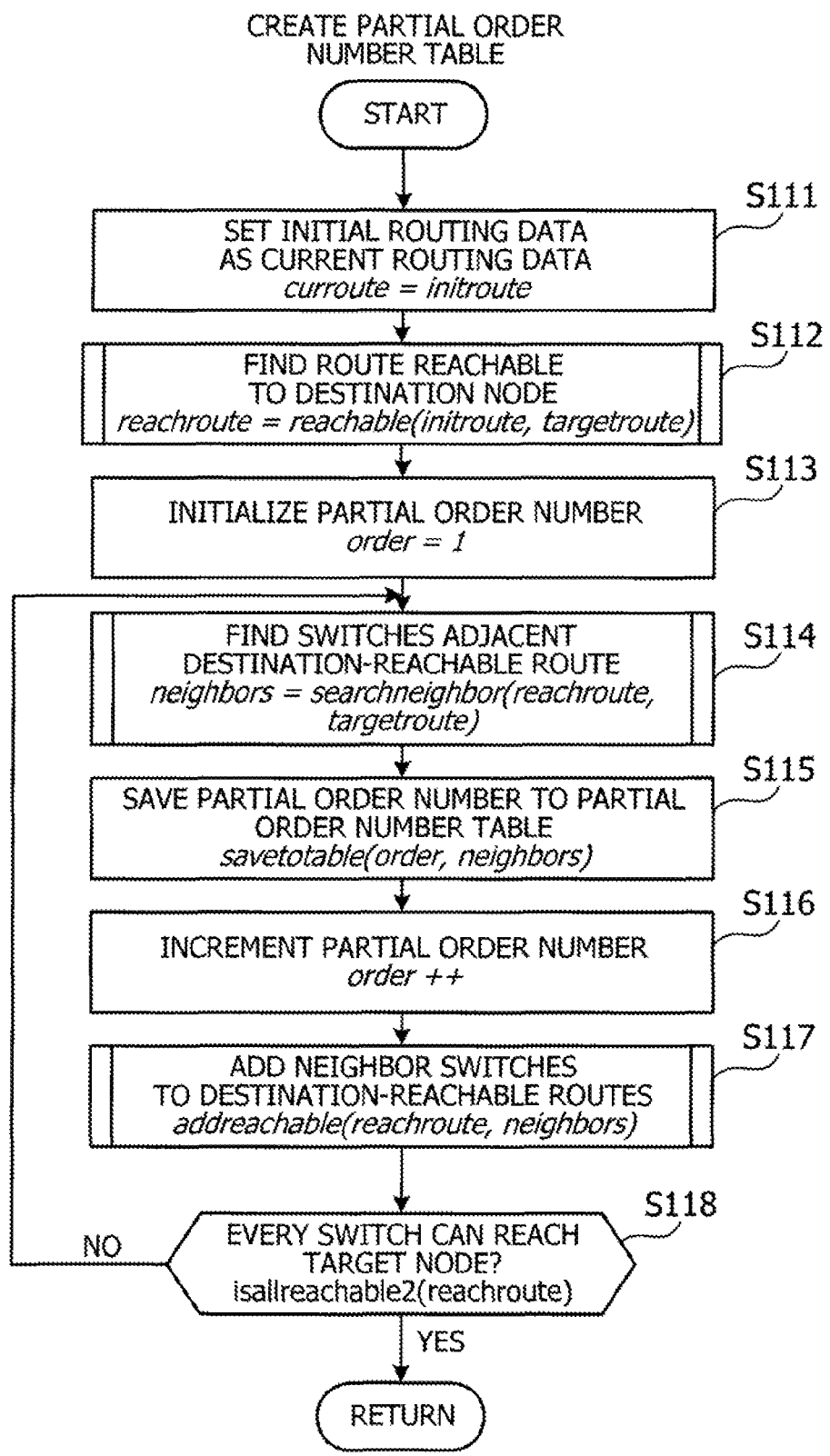
FIG. 26 is a flowchart of a process of producing a partial order number table.

The above-described process of FIG. 26, when applied to every prospective destination node of packets, produces a partial order number table for the network. FIG. 27 illustrates an example data structure of a partial order number table. This partial order number table 251 is a two-dimensional matrix, with switch IDs on the columns and destination addresses on the rows. Each cell of the matrix contains a partial order number associated with a combination of a switch ID and a destination address.

The example of FIG. 27, however, does not mean that the network management apparatus 200 can send those FDBs of each single switch all at once. Rather, doing so could introduce a loop in the network during the course of updating FDBs. Take switches B and C in FIG. 27, for example. The row of destination address 0x1 indicates that the FDB of switch B has to be updated before that of switch C. The row of destination address 0x6, on the other hand, indicates that the FDB of switch C has to be updated before that of switch B. Thus it is not possible to decide which of the two switches B and C should receive updated FDBs first.

As seen from the above example, it is inappropriate to combine all updated FDBs of a single switch for the purpose of FDB distribution, since an ordinal relationship between switches cannot always be resolved by comparing the table values assigned to one switch with that of another. This is why the table of FIG. 27 is called "partial order number table," and the values stored therein are called "partial order numbers."

That is, the partial order number table 251 gives a set of numerical values to each switch, which indicates partially ordered relationships between switches.

The above-described partial order number table 251 is produced by the FDB distribution sequencing unit 250 and stored temporarily in a storage space of RAM 102. Using this partial order number table 251, the FDB combining unit 260 and FDB distribution processing unit 270 determine the order of FDB distribution and issue an FDB update command to appropriate switches while combining FDBs as necessary.

Figure 28:
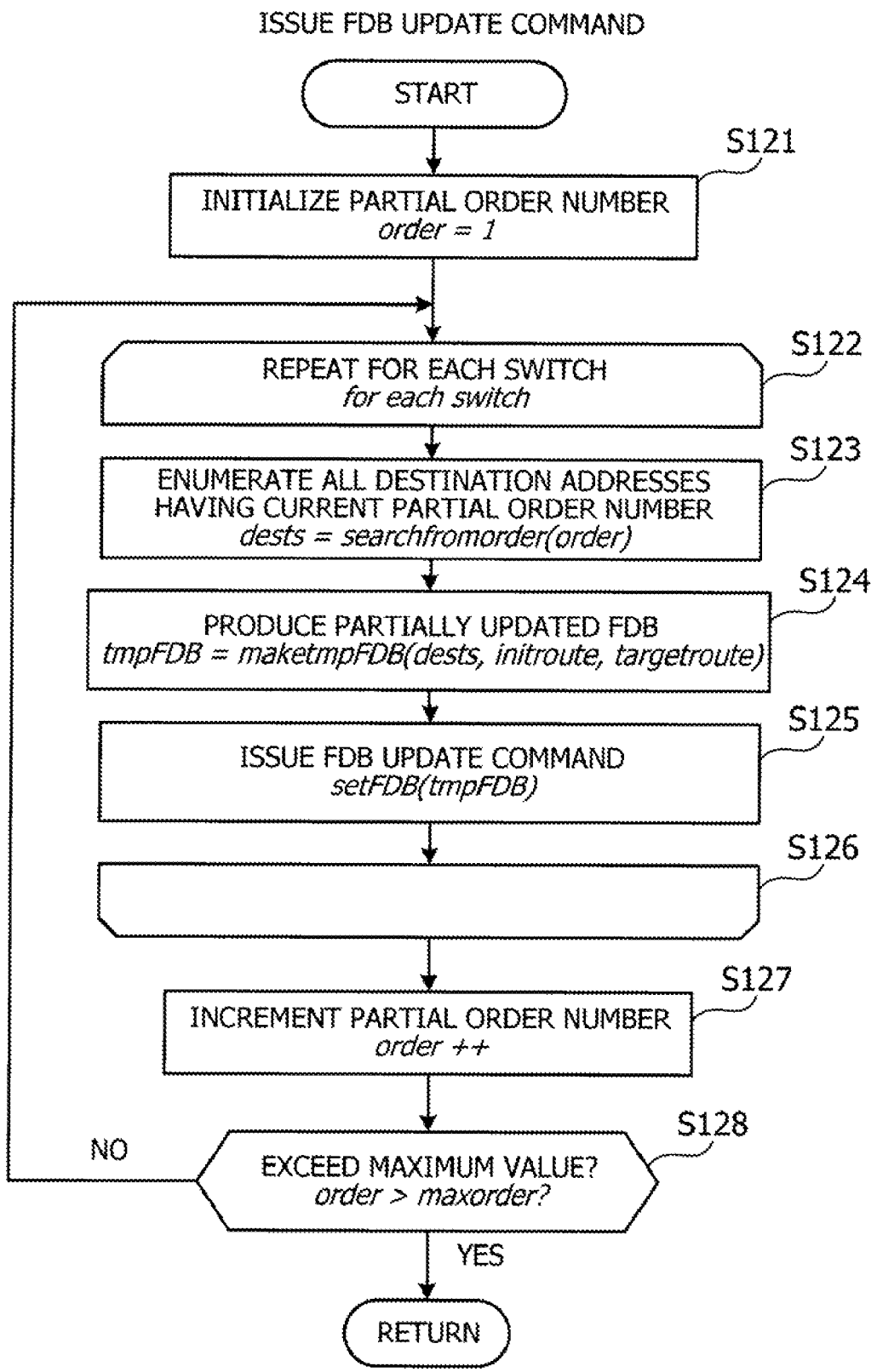
FIG. 28 is a flowchart of a process of issuing FDB update commands.

FIG. 28 is a flowchart of a process of issuing FDB update commands. The detailed steps of this process will now be described below in the order of step numbers.

(Step S121) The FDB combining unit 260 initializes variable "order" representing a partial order number which will be given to the switches to be updated. For example, this operation is executed as an instruction of "order=1" in a computer program.

(Step S122) The FDB combining unit 260 executes the following steps S123 to S125 for each and every switch.

(Step S123) By scanning the column corresponding to the currently focused switch in the partial order number table 251, the FDB combining unit 260 extracts destination addresses that match with the current partial order number. For example, this operation is executed as an instruction of "dests=searchfromorder(order)" in a computer program, where "searchfromorder( )" is a function that searches the partial order number table to find destination addresses corresponding to a specified value "order" of partial order number. The extracted destination addresses are then assigned to variable "dests."

(Step S124) The FDB combining unit 260 produces updated FDBs by changing output port field values corresponding to the destination addresses extracted at step S123. More specifically, the FDB combining unit 260 updates output port numbers for the extracted destination addresses, while maintaining the original output port numbers for the other destination addresses. For example, this operation is executed as an instruction of "tmpFDB=maketmpFDB(dests, initroute, targetroute)" in a computer program. Here, maketmpFDB( ) is a function that creates a partially modified FDB(s) from given arguments, i.e., "dests" specifying destination addresses, "initroute" specifying initial routing data, and "targetroute" specifying final routing data. More specifically, the function "maketmpFDB( )" compares initial routing data "initroute" with final routing data "targetroute" of each single destination address specified by variable "dests," so as to determine which output port is used to forward packets from the currently focused switch to their destinations. FDBs are thus produced for updating output ports corresponding to the destination addresses specified by variable "dests."

(Step S125) The FDB distribution processing unit 270 issues an FDB update command to the currently focused switch. Specifically, the FDB distribution processing unit 270 produces an FDB update command including FDBs produced at step S124 and sends it to the currently focused switch in the form of a control packet.

(Step S126) Upon completion of the above steps S123 to S125 for all switches, the FDB combining unit 260 advances to step S127.

(Step S127) The FDB combining unit 260 increments the partial order number. For example, this operation is executed as an instruction of "order++" in a computer program, which increments variable "order" by one.

(Step S128) The FDB combining unit 260 determines whether the partial order number has exceeded a maximum value of partial order numbers found in the partial order number table. For example, this test is executed as "order>maxorder" in a computer program, where "maxorder" is a variable representing a maximum value of partial order numbers. The FDB combining unit 260 exits from present process when the partial order number exceeds the maximum value. Otherwise, it goes back to step S122 to continue the process.

The above-described process creates new FDBs that reflect multiple changes made to the output ports of a switch, with respect to a plurality of destination addresses sharing the same partial order number. Those FDBs are distributed to the switches in ascending order of partial order numbers, thereby updating their local FDBs without producing any switching loops.

Referring now to FIGS. 29 to 34, the following section will provide a specific example of how the FDBs are updated according to the third embodiment.

Figure 29:
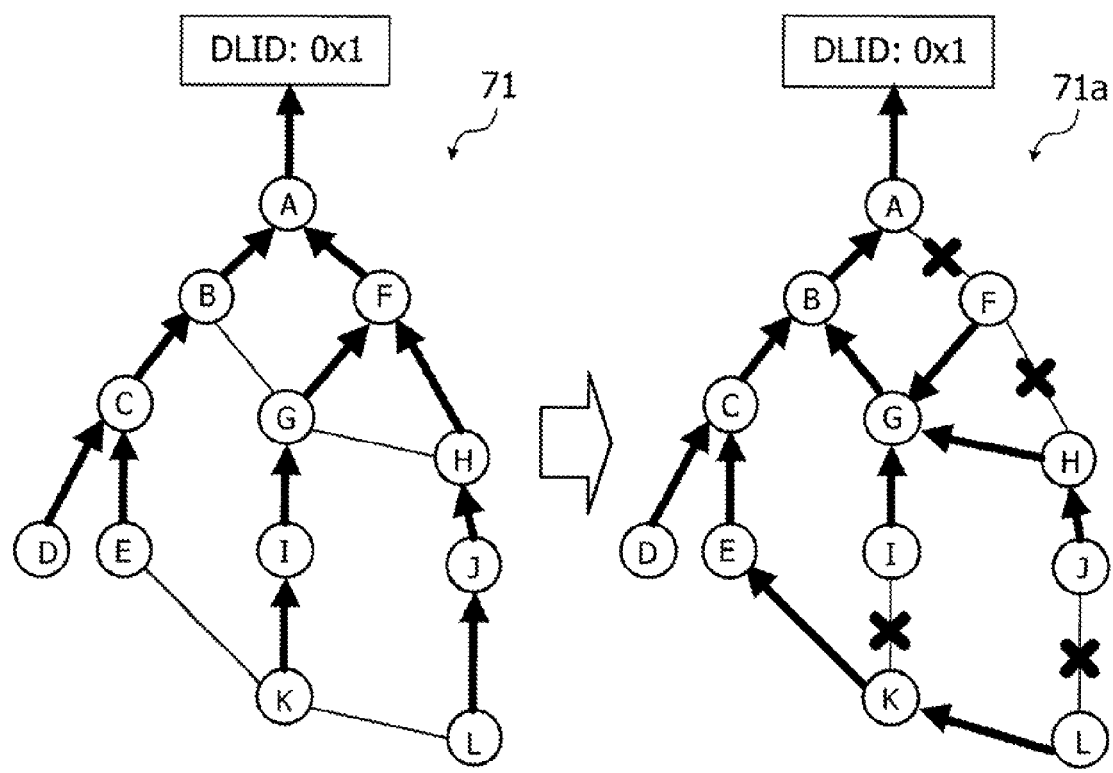
FIG. 29 illustrates initial and final states of packet forwarding routes to the destination with a DLID of 0x1.

FIG. 29 illustrates initial and final states of packet forwarding routes to the destination with a DLID of 0x1. As seen, the output ports of switches G and K have to be modified in the first place to effect the illustrated change in the forwarding routes from initial routing data 71 to final routing data 71a. Accordingly, a partial order number of 1 is given to these switches G and K for packets addressed to the destination with a DLID of 0x1. The next modification is to be made at the output ports of switches H and L, and accordingly, a partial order number of 2 is assigned to these switches for packets addressed to the destination with a DLID of 0x1.

Figure 30:
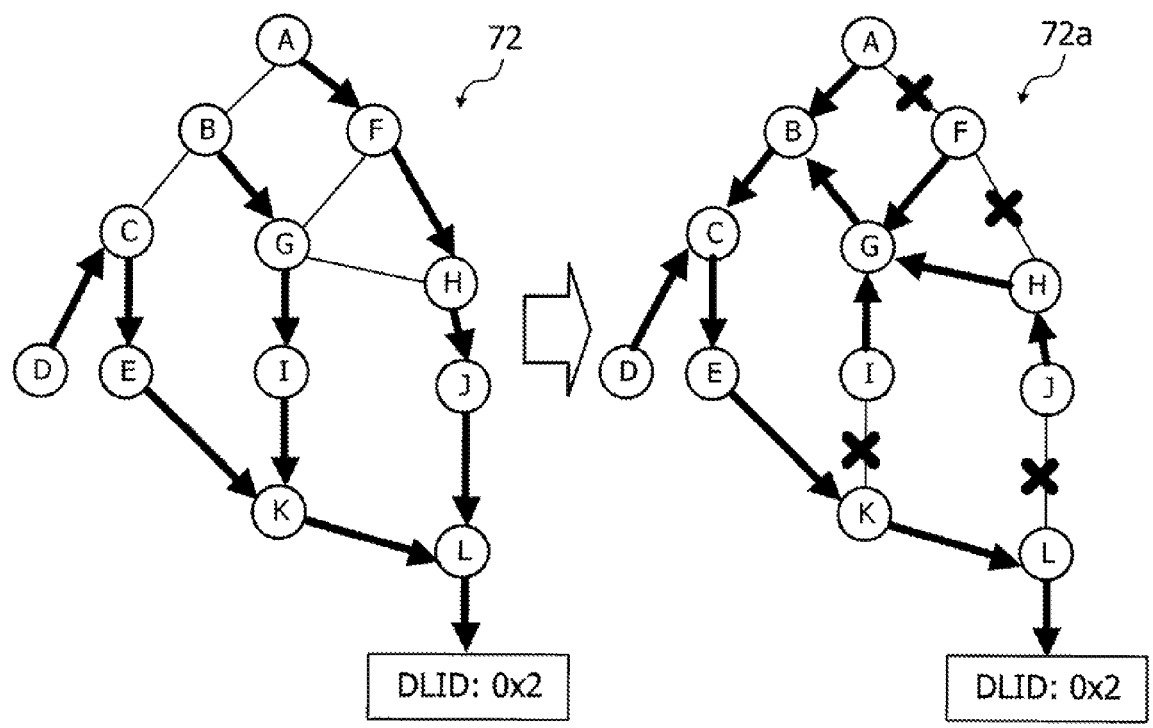
FIG. 30 illustrates initial and final states of packet forwarding routes to the destination with a DLID of 0x2.

FIG. 30 illustrates initial and final states of packet forwarding routes to the destination with a DLID of 0x2. As seen, the output ports of switch B have to be modified in the first place to effect the illustrated change in the forwarding routes from initial routing data 72 to final routing data 72a. Accordingly, a partial order number of 1 is given to the switch B for packets addressed to the destination with a DLID of 0x2. The next modification is to be made at the output ports of switches A and G, and accordingly, a partial order number of 2 is assigned to these switches for packets addressed to the destination with a DLID of 0x2. Further, the output ports of switches F, H, and I are to be modified, and accordingly, a partial order number of 3 is assigned to these switches for packets addressed to the destination with a DLID of 0x2. Lastly, the output ports of switch J are to be modified, and accordingly, a partial order number of 4 is assigned to this switch for packets addressed to the destination with a DLID of 0x2.

Figure 31:
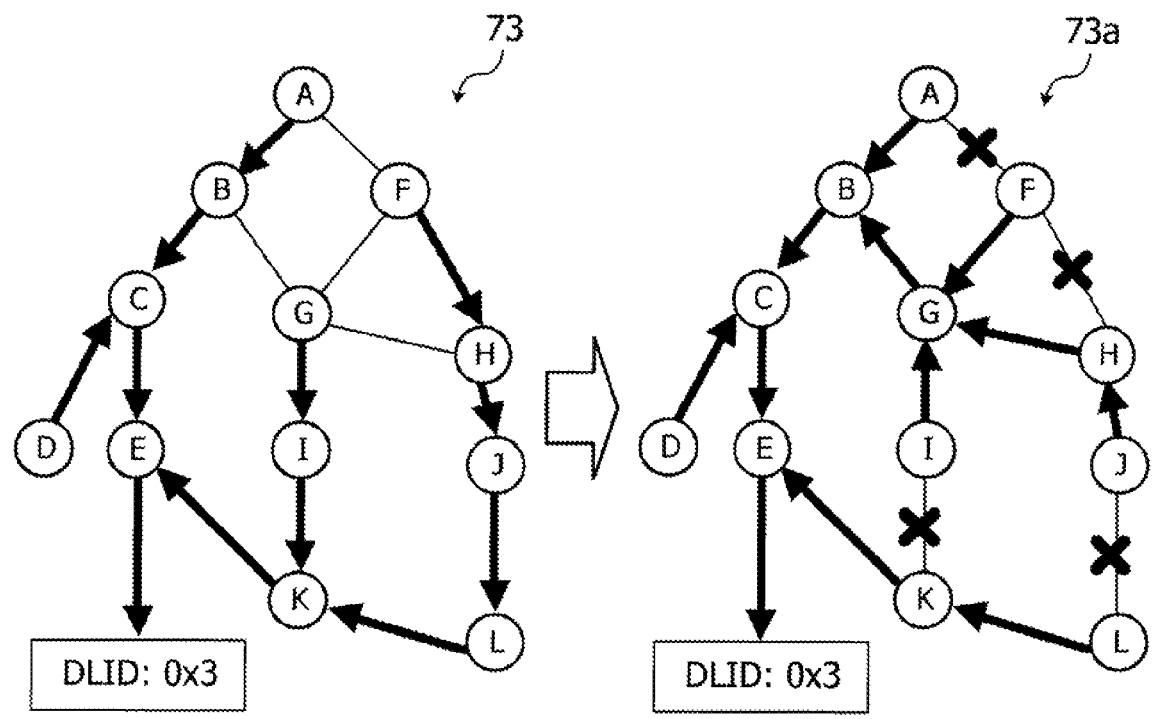
FIG. 31 illustrates initial and final states of packet forwarding routes to the destination with a DLID of 0x3.

FIG. 31 illustrates initial and final states of packet forwarding routes to the destination with a DLID of 0x3. As seen, the output ports of switch G have to be modified in the first place to effect the illustrated change in the forwarding routes from initial routing data 73 to final routing data 73a. Accordingly, a partial order number of 1 is given to the switch G for packets addressed to the destination with a DLID of 0x3. The next modification is to be made at the output ports of switches F, H, and I, and accordingly, a partial order number of 2 is assigned to these switches for packets addressed to the destination with a DLID of 0x3. The output ports of switch J are then to be modified, and accordingly, a partial order number of 3 is given to this switch for packets addressed to the destination with a DLID of 0x3.

Figure 32C:
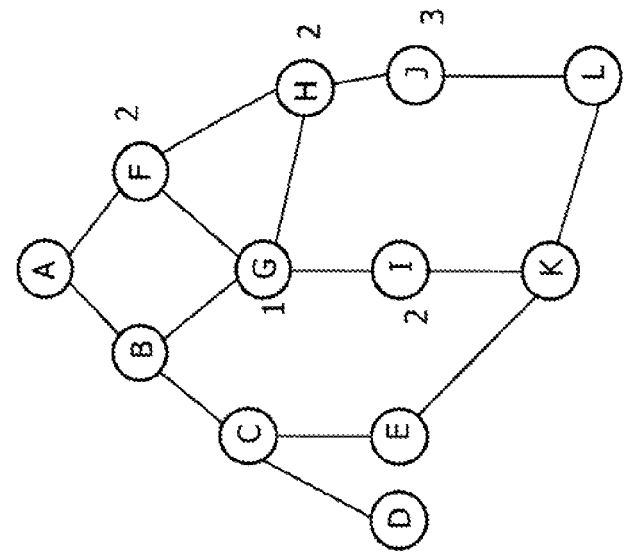
FIGS. 32A to 32C illustrate partial order numbers that have been assigned to the switches according to three different destination addresses.
Figure 32B:
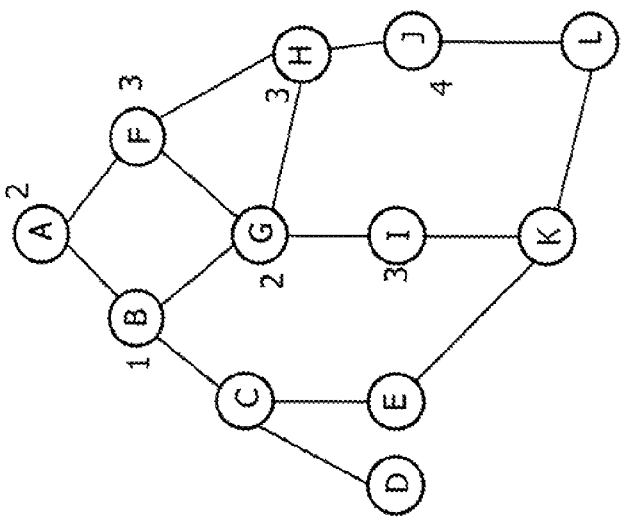
Figure 32A:
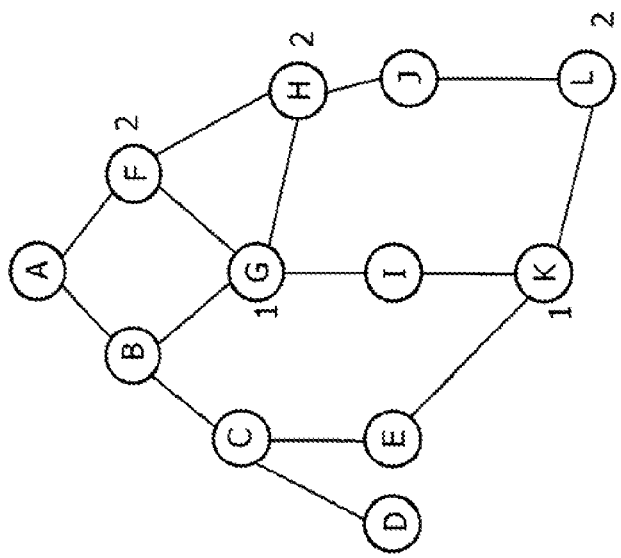

FIGS. 32A to 32C illustrate partial order numbers that have been assigned to the switches according to three different destination addresses. The alphabets in a circle represent switches, and the numerals placed beside them are partial order numbers assigned to the respective switches. A partial order number table is created by summarizing those partial order numbers for each different destination address.

FIG. 33 illustrates an example of the resulting partial order number table. The illustrated partial order number table 252 contains partial order numbers corresponding to each relevant combination of a switch and a destination address (DLID). Referring to a specific switch, the partial order number table 252 may give the same partial order number for different destination addresses. FDBs of such destination addresses can then be combined for the purpose of collective update of FDBs according to the third embodiment.

Take a switch 26 with a switch ID of F for example. The FDB in this switch 26 is subject to update for at least DLIDs of 0x1, 0x2, and 0x3. Of those three DLIDs, 0x1 and 0x3 are assigned a partial order number of 2, while 0x2 is assigned a partial order number of 3. Accordingly, one FDB is created to update the entries of DLIDs 0x1 and 0x3, and another FDB is created to do the same for DLID 0x2. The created FDBs are transmitted to the switch 26 in ascending order of their associated partial order numbers.

FIG. 34 gives an example of how the content of FDB changes in switch F. The original FDB 61a of the switch 26 specifies output port #3 for packets with a DLID of 0x1 and output port #2 for packets with a DLID of 0x2 or 0x3. The first cycle of FDB update (not illustrated) is executed to update some switches other than switch 26, the cycle being associated with the initial partial order number of 1. Upon completion of the first cycle, the second cycle of FDB update is executed to update the switch 26 and other switches. In this second cycle, the switch 26 receives an FDB 61b containing some of the necessary updates and stores the received FDB 61b in its local memory. As a result, the output port assignment for DLID=0x1 is changed from port #3 to port #1, and that for DLID=0x3 is changed from port #2 to port #1. It is noted that the assignment of output port #2 for DLID=0x2 stays unchanged.

In the third cycle of FDB update, an FDB 61c is delivered to the switch 26 to add more updates to its local FDB. That is, the FDB 61c changes the output port assignment for DLID=0x2 from #2 to #1.

As can be seen from the above example, the third embodiment combines a plurality of updates into a single FDB when their destination addresses share the same partial order number. This feature reduces the number of FDB transmissions. Referring again to FIG. 33, FDBs are distributed to nine switches in four cycles. Specifically, the first cycle of FDB update executes three FDB transmissions to update FDBs of three switches B, G, and K. The second cycle of FDB update executes six FDB transmissions to update FDBs of six switches A, F, G, H, I, and L. The third cycle of FDB update executes four FDB transmissions to update FDBs of four switches F, H, I, and J. The fourth cycle of FDB update executes one FDB transmission to update FDB of switch J. As a result of fourteen (3+6+4+1) FDB transmissions in total, all switches in the network are updated.

Without the feature of combining FDB updates, the FDB update process would have to execute five FDB transmissions for DLID=0x1, seven FDB transmissions for DLID=0x2, and five FDB transmissions for DLID=0x3. This amounts to seventeen FDB transmissions.

As can be seen from the above example, it is possible to reduce the number of FDB transmissions by combining multiple updates of output ports into a single FDB in the case where their destination addresses share the same partial order number. Without combining, the FDB update process would have to transmit as many FDBs as the number of updated switches multiplied by the number of DLIDs in the worst case. The third embodiment reduces it to at most the number of updated switches multiplied by the maximum partial order number, thus achieving a significant reduction of FDB transmissions.

The example of FIG. 33 assumes only three destination addresses for simplicity purposes and thus demonstrates a modest improvement in processing efficiency. However, the advantage of combining FDBs becomes more prominent as the number of destination addresses is increased. Generally a computer network employing many switches accommodates a large number of nodes, and in which case the proposed feature of combining FDBs greatly improves the efficiency of FDB update.

It is noted that the third embodiment is designed to combine FDBs only when they share the same partial order number. This is why the proposed FDB update process does not produce any switching loops, which (if exist) would trap packets addressed to a specific destination. In other words, the third embodiment not only ensures reliability of the network (i.e., updating FDBs without introducing loops), but also improves the efficiency of network management operation (i.e., reducing FDB transmissions).

Variations

The foregoing second and third embodiments assume that the network is supposed to automatically recover from failure by redistributing FDBs. Accordingly, final routing data is created by the network management apparatuses 100 and 200. Route-changing events in a network may not necessarily be confined to failures, but may arise during the work of performance tuning, for example. In the latter case, the network administrator may specify his or her desired routing data, and the network management apparatus 100 and 200 executes a process of changing routes by using the specified routing data as updated routing data.

The foregoing second and third embodiments distribute FDBs via the same links as used for data communication between nodes. FDBs are carried by control packets which do not rely on the forwarding mechanism using FDBs in the switches. As an alternative configuration, it is also possible to employ a dedicated network for management purposes, apart from the above data communication links, to connect the network management apparatus 100 and 200 with each switch 21 to 32. In this case, the network management apparatus 100 and 200 uses such a management network to distribute FDBs which are used to transport data packets between nodes.

Computer-Readable Medium

The processing functions of network management apparatuses 100 and 200 discussed above may be implemented on a computer system, the instructions being encoded and provided in the form of computer programs. A computer system executes such programs to provide the above-described processing functions. Those programs are stored in a non-transitory computer-readable medium for the purpose of storage and distribution. Suitable non-transitory computer-readable storage media include magnetic storage devices, optical discs, magneto-optical storage media, semiconductor memory devices, and other tangible storage media. Magnetic storage devices include hard disk drives (HDD), floppy disks (FD), and magnetic tapes, for example. Optical disc media include DVD, DVD-RAM, CD-ROM, and CD-RW, for example. Magneto-optical storage media include magneto-optical discs (MO), for example.

Portable storage media, such as DVD and CD-ROM, are suitable for distribution of program products.

A user computer stores necessary software components in its local storage unit, which have previously been installed from a portable storage media or downloaded from a server computer. The computer executes the programs read out of the local storage unit, thereby performing the programmed functions. Where appropriate, the user computer may directly execute program codes read out of the portable storage medium, without installing them in its local storage device. Another alternative method is that the user computer dynamically downloads programs from a server computer when they are demanded and executes them upon delivery.

It is also possible to implement at least part of the foregoing processing functions of the embodiments in a digital signal processor (DSP), application-specific integrated circuit (ASIC), programmable logic device (PLD), and other electronic circuits.

CONCLUSION

Preferred embodiments have been described above. These embodiments make it possible to change the packet forwarding routes in a network without producing any loops.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present invention has(have) been described in detail, it should be understood that various changes, substitutions, and alterations could be made hereto without departing from the spirit and scope of the invention.

What is claimed is:

1. A non-transitory computer-readable medium encoded with a network management program for managing a plurality of communication devices which forward packets based on forwarding data describing associations between destination addresses and output ports, the network management program, when executed by a computer, causing the computer to execute a procedure comprising:
changing original routes, which have been determined from forwarding data of the communication devices, to new routes in response to an event that influences existing forwarding routes of packets;
identifying a destination-reachable range from which packets can reach a destination information processing device specified by a destination address, by extracting partial routes that include at least a communication device adjacent to the destination information processing device and belong to both the original routes before update and the new routes after update;
identifying a destination-unreachable range from which no packets can reach the destination information processing device, by excluding the identified destination-reachable range from the original routes;
modifying output port parameters in the forwarding data of a neighbor communication device which is located in the destination-unreachable range and adjacent to one of the communication devices in the destination-reachable range, so as to permit forwarding of packets from the neighbor communication device to said one of the communication devices in the destination-reachable range;

transmitting the modified forwarding data to the neighbor communication device; and adding to the destination-reachable range an additional destination-reachable range which has become capable of reaching the destination information processing device as a result of the modification of the forwarding data.

2. The non-transitory computer-readable medium according to claim 1, wherein:

the event that influences existing forwarding routes of packets is reception of information from a communication device which indicates communication failure at one of output ports thereof; and said changing changes the original routes so as to enable forwarding of packets from the third communication device without using the failed output port.

3. The non-transitory computer-readable medium according to claim 1, wherein the process further comprises executing another cycle of said identifying of destination-reachable and destination-unreachable ranges, said modifying, and said adding, when at least one of the communication devices still remains in the destination-unreachable range even after said adding is performed.

4. The non-transitory computer-readable medium according to claim 1, wherein the process further comprises:

storing a sequence number dataset that associates each combination of a destination address and a communication device with a sequence number specifying order of transmission of the forwarding data corresponding to said combination;

executing, for each different destination address, one or more cycles of said identifying of a destination-reachable range, said identifying of a destination-unreachable range, said modifying, and said adding;

populating the sequence number dataset with a series of sequence numbers, such that the same sequence number is assigned to the neighbor communication devices whose routing data is modified during a single cycle of said modifying; and combining updates to the forwarding data of a single neighbor communication device with respect to a plurality of destination addresses when the sequence number dataset indicates the combinations of said single neighbor communication device and said plurality of destination addresses are associated with the same sequence number;

wherein said transmitting transmits the forwarding data containing the combined updates.

5. The non-transitory computer-readable medium according to claim 4, wherein:

said populating increments the sequence number for the neighbor communication devices each time said modifying is executed for a specific destination address; and said transmitting transmits the forwarding data containing the combined updates, to different neighboring communication devices in ascending order of the sequence numbers assigned to the combinations of said different neighboring communication devices and said plurality of destination addresses.

6. A network management apparatus for managing a plurality of communication devices which forward packets based on forwarding data describing associations between destination addresses and output ports, the network management apparatus comprising:

route updating means for changing original routes, which have been determined from forwarding data of the communication devices, to new routes in response to an event that influences existing forwarding routes of packets;

range finding means for identifying a destination-reachable range from which packets can reach a destination information processing device specified by a destination address, by extracting partial routes that include at least a communication device adjacent to the destination information processing device and belong to both the original routes before update and the new routes after update, as well as identifying a destination-unreachable range from which no packets can reach the destination information processing device, by excluding the identified destination-reachable range from the original routes;

data modifying means for modifying output port parameters in the forwarding data of a neighbor communication device which is located in the destination-unreachable range and adjacent to one of the communication devices in the destination-reachable range, so as to permit forwarding of packets from the neighbor communication device to said one of the communication devices in the destination-reachable range;

data transmitting means for transmitting the modified forwarding data to the neighbor communication device; and range expanding means for adding to the destination-reachable range an additional destination-reachable range which has become capable of reaching the destination information processing device as a result of the modification of the forwarding data.

7. The network management apparatus according to claim 6, wherein:

said range finding means, data modifying means, and range expanding means execute repetitively for each different destination address;

the network management apparatus further comprises:

memory means for storing a sequence number dataset that associates each combination of a destination address and a communication device with a sequence number specifying order of transmission of the forwarding data corresponding to said combination, and sequence number generating means for populating the sequence number dataset with a series of sequence numbers, such that the same sequence number is assigned to the neighbor communication devices whose routing data is modified during a single cycle of execution of said data modifying means; and said data transmitting means is configured to combine updates to the forwarding data of a single neighbor communication device with respect to a plurality of destination addresses when the sequence number dataset indicates the combinations of said single neighbor communication device and said plurality of destination addresses are associated with the same sequence number, and to transmit the forwarding data containing the combined updates.

8. A network management method executed by a computer to manage a plurality of communication devices which forward packets based on forwarding data describing associations between destination addresses and output ports, the network management method comprising:

changing original routes, which have been determined from forwarding data of the communication devices, to new routes in response to an event that influences existing forwarding routes of packets;

identifying a destination-reachable range from which packets can reach a destination information processing device specified by a destination address, by extracting partial routes that include at least a communication device adjacent to the destination information processing device and belong to both the original routes before update and the new routes after update;

identifying a destination-unreachable range from which no packets can reach the destination information processing device, by excluding the identified destination-reachable range from the original routes;

modifying output port parameters in the forwarding data of a neighbor communication device which is located in the destination-unreachable range and adjacent to one of the communication devices in the destination-reachable range, so as to permit forwarding of packets from the neighbor communication device to said one of the communication devices in the destination-reachable range;

transmitting the modified forwarding data to the neighbor communication device; and adding to the destination-reachable range an additional destination-reachable range which has become capable of reaching the destination information processing device as a result of the modification of the forwarding data.

9. A network management apparatus for managing a plurality of communication devices which forward packets based on forwarding data describing associations between destination addresses and output ports, the network management apparatus comprising:

a processor to change original routes, which have been determined from forwarding data of the communication devices, to new routes in response to an event that influences existing forwarding routes of packets, to identify a destination-reachable range from which packets can reach a destination information processing device specified by a destination address, by extracting partial routes that include at least a communication device adjacent to the destination information processing device and belong to both the original routes before update and the new routes after update, as well as identifying a destination-unreachable range from which no packets can reach the destination information processing device, by excluding the identified destination-reachable range from the original routes, to modify output port parameters in the forwarding data of a neighbor communication device which is located in the destination-unreachable range and adjacent to one of the communication devices in the destination-reachable range, so as to permit forwarding of packets from the neighbor communication device to said one of the communication devices in the destination-reachable range;

to transmit the modified forwarding data to the neighbor communication device, and to add to the destination-reachable range an additional destination-reachable range which has become capable of reaching the destination information processing device as a result of the modification of the forwarding data.

* * * * *